US010525393B2

(12) United States Patent
Kawano

(10) Patent No.: US 10,525,393 B2
(45) Date of Patent: Jan. 7, 2020

(54) FILTER MECHANISM

(71) Applicant: Nippon Oil Pump Co., Ltd., Kumagaya-shi, Saitama (JP)

(72) Inventor: Yuji Kawano, Kumagaya (JP)

(73) Assignee: NIPPON OIL PUMP CO., LTD., Kumagaya-shi (JP)

( * ) Notice: Subject to any disclaimer, the term of this patent is extended or adjusted under 35 U.S.C. 154(b) by 0 days.

(21) Appl. No.: 15/950,811

(22) Filed: Apr. 11, 2018

(65) Prior Publication Data

US 2018/0229172 A1 Aug. 16, 2018

Related U.S. Application Data

(62) Division of application No. 14/112,127, filed as application No. PCT/JP2011/060506 on May 2, 2011, now Pat. No. 10,040,013.

(51) Int. Cl.

| *B01D 29/86* | (2006.01) |
| *B01D 33/68* | (2006.01) |
| *B01D 29/62* | (2006.01) |
| *B01D 46/00* | (2006.01) |
| *B23Q 11/10* | (2006.01) |

(52) U.S. Cl.
CPC ......... *B01D 46/0064* (2013.01); *B01D 29/62* (2013.01); *B01D 29/86* (2013.01); *B01D 33/68* (2013.01); *B23Q 11/1069* (2013.01)

(58) Field of Classification Search
None
See application file for complete search history.

(56) References Cited

U.S. PATENT DOCUMENTS

| 1,375,406 A | 4/1921 | Merrell |
| 2,056,888 A | 10/1936 | Pecker |
| 3,356,218 A * | 12/1967 | Grudoski ............ A47J 37/1223 210/167.28 |

(Continued)

FOREIGN PATENT DOCUMENTS

| JP | 44-19673 | 8/1969 |
| JP | 53-64872 | 6/1978 |

(Continued)

OTHER PUBLICATIONS

Arai et al., Translation of JPS63200811, published 1988, 14 total pages (Year: 1988).*

(Continued)

*Primary Examiner* — Jonathan M Peo
(74) *Attorney, Agent, or Firm* — Kratz, Quintos & Hanson, LLP

(57) ABSTRACT

The present invention is a filter mechanism provided in a pump or the like, and the purpose thereof is to provide a filter mechanism that can eliminate foreign matter adhering to the surface of a filter and thereby can prevent clogging of filters because of foreign matter. According to the present invention, an area toward the inside in the direction of the radius of the filter is linked to an intake opening (235) of the pump (for example, a trochoid pump (22)) and, via the pump (22) to a pump ejection opening (trochoid pump ejection opening (215)), and an area between a filter (5) and (an inside wall surface (3i) of) a first casing (3) is linked to a low-pressure ejection opening (discharge opening (237)) for a working fluid.

4 Claims, 10 Drawing Sheets

(56) References Cited

U.S. PATENT DOCUMENTS

| | | | |
|---|---|---|---|
| 3,583,567 | A | 6/1971 | Maestrelli |
| 4,024,062 | A | 5/1977 | Holthuis |
| 5,080,788 | A | 1/1992 | Chen |
| 6,027,656 | A | 2/2000 | Henttonen |
| 6,309,544 | B1 * | 10/2001 | Hurwitz ................ B01D 29/41 210/330 |
| 2005/0160723 | A1 | 7/2005 | Seipler |
| 2008/0190870 | A1 | 8/2008 | Schoeb |
| 2009/0001027 | A1 | 1/2009 | Carew |
| 2009/0056542 | A1 | 3/2009 | Carew |
| 2010/0186355 | A1 | 7/2010 | Fujiyama |

FOREIGN PATENT DOCUMENTS

| | | |
|---|---|---|
| JP | 58079513 | 5/1983 |
| JP | 59-216611 | 12/1984 |
| JP | S59-216611 A | 12/1984 |
| JP | 63-200811 | 8/1988 |
| JP | 01-189313 | 7/1989 |
| JP | H05-26113 U | 4/1993 |
| JP | H05-26113 U | 4/1993 |
| JP | 10-5512 | 1/1998 |
| JP | H10-109007 | 4/1998 |
| JP | 2005-238071 | 9/2005 |
| JP | 2010-167534 A | 8/2010 |
| JP | 2010167534 | 8/2010 |

OTHER PUBLICATIONS

Umeda et al., Translation of JPS58079513, published 1983, 7 total pages (Year: 1983).*

Extended European Search Report dated Sep. 22, 2014 in the corresponding European patent application No. 11864635.5-1356.

Machine Translation of JPH0526113 U, Yoshihisa et al., 1993.

Arai et al., Machine Translation of JPS63200811:, published 1987, 14 total pages.

Umeda et al., "Machine Translation of JPS5879513", published 1983, 7 total pages.

K.A. Gavhane, "Unit Operations—I : Fluid Flow and Mechanical Operations", published by Nirali Prakashan, Feb. 2009, pp. 6.7-6.9, 6 total pages.

Office Action pursuant to 94(3) EPC of European Patent Application No. 11864635.5 dated Apr. 17, 2019 (8 sheets).

* cited by examiner

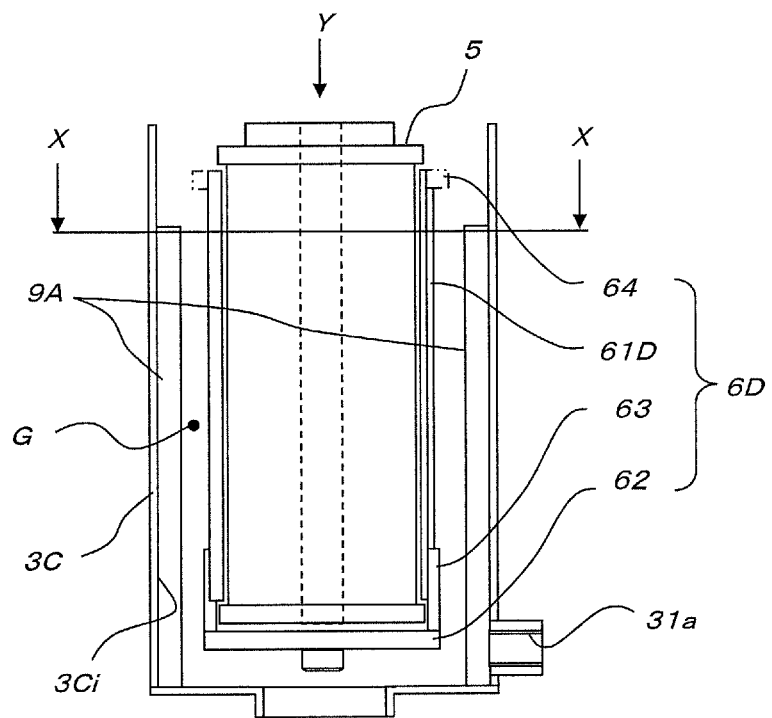
Fig.10
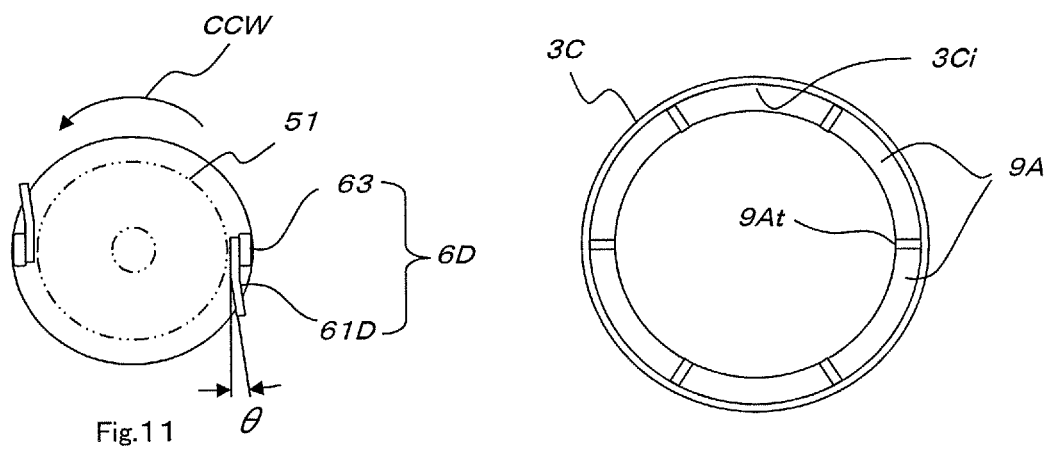
Fig.11
Fig.12

FILTER MECHANISM

CROSS-REFERENCE TO RELATED APPLICATIONS

This application is a Divisional Application of U.S. application Ser. No. 14/112,127, filed Oct. 16, 2013, which is the § 371 National Stage patent application of International Application No. PCT/JP2011/060506 filed on May 2, 2011, and designated United States, the entire contents of each of which are incorporated herein by reference.

TECHNICAL FIELD

The present invention relates to a filter mechanism being constructed in order to eliminate foreign matter in, e.g., a coolant pump supplying a coolant which is supplied from a coolant tank to a working machine and lubricates and cools a tool and material being processed.

BACKGROUND ART

In a working machine, foreign matters such as metal powder (being so-called "chips") are generated during processing of a workpiece. These foreign matters are usually returned together with a coolant to a coolant tank. Here, although a large foreign matter is captured/discarded by a strainer or the like, a relatively small foreign matter (chips or the like) can penetrate or pass through a strainer or like and floats in a coolant as a so-called "contaminant". Further, various kinds of airborne dust in air may be mixed into this coolant in some cases.

In a machining center of a numerically controlled lathe, a coolant is injected from a tool end, a workpiece or a tool is cooled, discharge of chips is enhanced, and a machining speed or a machining accuracy is improved. In this case, in order to protect a coolant circulation pump or maintain a machining accuracy, a cyclone filter or a filter element type filter is used.

In a case that a filter element type filter is used, a contaminant such as a fine scrap metal mixed in the coolant clogs the filter. Therefore, periodical maintenance, such as replacement of the filter or cleaning of the filter, is required.

Although use of a cyclone filter can be considered in order to eliminate the need for the maintenance, e.g., the replacement of the filter or the cleaning of the filter, filtration of the cyclone filter is not satisfactory, and there are disadvantages of a cyclone filter, for example, operation thereof is limited in oil, and light dust like airborne dust in air can not be filtered.

Therefore, in a working machine, in a case that highly precise filtration is required, use of a filter provided with a filter element is unavoidable. However, as described above, there are problems that a cycle for the replacement or the cleaning of the filter is short and that a running cost is thereby expensive. Therefore, a filter which does not have to be frequently cleaned has been desired.

However, an effective filter that does not have to be frequently cleaned, that removes foreign matters adhering to the filter efficiently, that eliminates clogging, or that prevent such clogging, has not been suggested yet.

As a prior art for cleaning a filter, for example, there is a prior art in which a filter rotates and removes foreign matters adhering thereto by using centrifugal force (Refer to Patent Literature 1).

However, according to this prior art (Patent Literature 1), since power used for rotating the filter is additionally required or a rotation transmission mechanism for transmitting rotation from a rotary drive source for a pump to filter is additionally required, an amount of energy consumption increases and constructions thereof are complicated.

Furthermore, although a foreign matter having large specific gravity like a metal can be removed from a filter surface by the centrifugal force, a foreign matter having small specific gravity like so-called "dust" or "dirt" cannot be removed from the filter surface by centrifugal separation, because the centrifugal force acting thereto is small.

Moreover, there is a situation where fine foreign particles that have once passed through the filter are pressed against a filter inner wall by the centrifugal force, and therefore, it is possible to generate clogging in the filter.

CITATION LIST

Patent Literature

Patent Literature 1: Japanese Patent Application Publication No. Hei 10-109007 (JPA H10-109007)

DISCLOSURE OF INVENTION

Problem to be Solved by the Invention

In view of the above-described problems of the prior art, it is an object of the present invention to provide a filter mechanism which is provided in a pump etc., which can remove foreign matters adhering to a filter surface, and therefore, which can prevent clogging of the filter caused due to foreign matters.

Means for Solving Problem

A filter mechanism according to the present invention is characterized in that a filter (a filter element 51) is accommodated in a first casing (a filter casing 3), a space (G) is formed between the filter (51) and a first casing inner wall surface (3i) in a radial direction, a rotatable (in a circumferential direction) blade (a rotary blade 61, a swirl vane) is arranged in the space (G) formed in the radial direction, and the rotary blade (61) extends to be parallel to a central axis of the first casing (3) (FIG. 1).

In the present invention, a cross-sectional configuration of the rotary blade can be appropriately selected in accordance with a rotating speed of the rotary blade or a type of a working fluid (liquid and/or gas). For example, in a case that the rotating speed of the rotary blade is low or that specific gravity or viscosity of the working fluid (a gas) is low, it is preferable for the rotary blade (61, 61A) to be shaped a tabular cross-sectional configuration in which parts near both end portions are bent (FIG. 2, FIG. 3).

Here, in a case that the cross-sectional configuration of the rotary blade is formed into a blade-like shape, since it is possible to operate in many kind of working fluids with viscosity being in the wide numerical range, it is preferable.

Alternatively, the cross-sectional configuration of the rotary blade (61B, 61C) may be a blade-like shape (FIG. 4) or a circular shape (FIG. 5).

Here, the filter (51) does not rotate (or turn), and cross-sectional configuration thereof is, e.g., a circular shape.

In an embodiment of the present invention, it is preferable that an radially inner region of the filter (51) communicates with a pump ejection opening (a trochoid pump ejection opening 215) through an intake opening (235) of a pump (e.g., a trochoid pump 22) and the pump (22), and that a region between the filter (51) and (an inner wall surface 3*i* of) the first casing (3) communicates with a low-pressure ejection opening (a discharge opening 237) for a working fluid.

In the present invention, it is preferable that a second casing (an impeller casing 400) accommodating a rotary pump (e.g., an impeller 460) (in a low-pressure generation unit placed in a coolant tank) is provided and the second impeller casing (400) communicates with the first casing (3) (FIG. 6, FIG. 9, FIG. 16).

Here, as the rotary pump, for example, an impeller (460, 460A) can be selected. Moreover, the impeller (460, 460A) may be of either type so-called "semi-open type" or so-called "closed type".

It is to be noted that an axial flow pump or any other rotary pump can be selected in place of the impeller (460, 460A).

Additionally, it is preferable to provide a baffle plate (a fin 9, 9A) on the inner wall surface (3*i*) of the first casing at a position where the baffle plate does not interfere with the rotary blade (61) (FIG. 7 to FIG. 16).

Here, it is preferable for the baffle plate (9A) to be helically arranged (FIG. 10 to FIG. 16).

Further, in the present invention, it is preferable for the blade (61E) to be helically formed (FIG. 17).

Effect of the Invention

According to the present invention having the above-described construction, when the blade (61) between the filter (51) and the casing inner wall surface (3*i*) is rotated or turned, a speed difference is produced between the blade and the working fluid present in the space (G) between the filter (51) and the casing inner wall (3*i*).

In the space (G) between the filter (51) and the casing inner wall (3*i*), when the rotating blade (61, 61A, 61B, 61C, 61E) proceeds in the working fluid (e.g., a coolant), a turbulent flow is generated behind the blade, and a flow that sucks the working fluid from the inside of the filter (51) to the outside of the filter (51) is generated. Foreign matters are detached from the outer peripheral surface of the filter (51) by such the turbulent flow or the flow that sucks the working fluid.

Functions and effects for detaching foreign matters from the outer peripheral surface of the filter (51) are large in a case that the speed difference between the rotating speed of the rotary blade and the turning speed of the working fluid in the space (G) between the filter (51) and the casing inner wall (3*i*) is large. Further, when the speed difference between the rotary blade and the working fluid becomes maximum, i.e., at the time of activating rotation of the rotary blade, functions and effects for detaching foreign matters from the outer peripheral surface of the filter (51) become maximum.

In addition, as to the configuration of the blade for producing the turbulent flow, reducing (thinning) a thickness dimension of the blade configuration is preferable in aspect of energy saving.

When the blade (the rotary blade: 61, 61A, 61B, 61C, 61E) is rotated so as to produce the speed difference between the blade and the working fluid in the space (G) between the filter (51) and the casing inner wall (3*i*), since a pressure of the working fluid is low in a region where a flow velocity is high based on the Bernoulli's theorem, the pressure in this region is lowered at the time of passage of the rotating blade (61, 61A, 61B, 61C, 61E). As a result, when the rotating blade (61, 61A, 61B, 61C, 61E) passes, the pressure in this region becomes lower than a pressure in the radially inner region of the filter (51).

Then, in a region where the blade (61, 61A, 61B, 61C, 61E) passes, force (Pr) operating from the radially inner side of the filter (51) toward the radially outer side of the same is generated due to pressure difference between the radially outer side and the radially inner side of the filter (51).

This force (Pr) enables removing (detaching) foreign matters adhering to the radially outer surface of the filter (51) from the filter (51).

In a case that the cross-sectional configuration of the rotating blade is a thin blade-like shape (61B), the force operating from the radially inner side toward the radially outer side is easily generated, the force becomes large and is advantageous in aspect of energy saving, and therefore, it is preferable.

Moreover, in a case that the speed difference is present between the turning speed of the working fluid and the rotating speed of the blade (61, 61A, 61B, 61C, 61E) in the space (G) between the filter (51) and the casing inner wall (3*i*), a turbulent flow is generated behind the rotating (or turning) blade (61, 61A, 61B, 61C, 61E) (behind the turning direction of the blade: the downstream side of the blade), and a vortex (V) is produced.

Since each blade (61, 61A, 61B, 61C, 61E) passes a position very close to the radially outer surface of the filter (51), a rotation force generated by to the turbulent flow and the vortex (V) generated behind the blade (61, 61A, 61B, 61C, 61E) causes a function for detaching foreign matters adhering to the radially outer surface of the filter (51).

According to the present invention, foreign matters adhering to the radially outer surface of the filter (51) are detached by a rotation force generated by the turbulent flow or the vortex (V) behind the blade (61, 61A, 61B, 61C, 61E), which force operates in place of the force (Pr) operating from the radially inner side toward the radially outer side of the filter (51) or in addition to the force (Pr), whereby the foreign matters can be prevented from adhering to the surface of the filter (51).

Here, according to the present invention, since the radially inner region of the filter (51) communicates with the intake opening (235) of, e.g., the trochoid pump (22), an inlet pressure of the pump (22) constantly operates, and therefore, suction force operates to the working fluid in the radially outer region of the filter (51).

Therefore, a flow moving from the radially outer side toward the radially inner side of the filter (51) is constantly present in the working fluid, and foreign matters adhering to the radially inner side of the filter (51) are detached.

That is, the present invention has functions and effects for detaching foreign matters adhering to the radially outer surface of the filter (51), preventing foreign matters from adhering to the radially inner surface, filtering the working fluid supplied to the pump intake opening (235) assuredly, and supplying the clean working fluid to the pump (22).

In the present invention, in a case that the impeller casing (400) accommodating the impeller (460) is provided, the working fluid can be supplied into a pump apparatus by operating the inlet pressure of the pump (e.g., the trochoid pump 22), and a pressure can be applied to the working fluid to be flowed to the radially inner region of the filter (51) due to rotating force of the impeller (460).

Moreover, foreign matters detached from the filter (51) can be efficiently discharged from a foreign matter discharge opening (237, 31*a*) being provided to the casing (3) due to pressure being applied by the impeller (460A).

According to the present invention, a direction along which the blade (61, 61A, 61B, 61C, 61E) rotates or turns (either a clockwise direction or a counterclockwise direction along a circumferential direction of the filter 51) coincides with a direction along which the working fluid turns in the space between the filter (51) and the casing inner wall (3i).

Additionally, the function for detaching foreign matters adhering to the radially outer surface of the filter (51) becomes remarkable, in a case that the speed difference between the turning speed of the working fluid and the rotating (turning) speed of the blade (61, 61A, 61B, 61C, 61E) becomes larger. Therefore, in the present invention having the above-described constructions, foreign matters adhering to the radially outer surface of the filter (51) are detached at a maximum immediately after rotation (turning) of each blade (61, 61A, 61B, 61C, 61E).

On the other hand, in the present invention, in a case that the baffle plate (the fin 9, 9A) is provided on the inner wall surface (3i, 3Ai, 3Bi, 3Ci) of the casing, since a swirl flow speed of the working fluid is lowered by the baffle plate (9, 9A), the speed difference between the turning speed of the working fluid and the rotating (turning) speed of the blade (61, 61A, 61B, 61C, 61E) becomes large.

Therefore, the function for detaching foreign matters adhering to the radially outward surface of the filter (51) can be excellently exercised at any timing, other than immediately after turning of the blade (61, 61A, 61B, 61C, 61E) or immediately after stoppage of turning of the same.

Further, in a case that the baffle plate (9A) is helically arranged, the working fluid containing foreign matters can be flowed up or down along the helix, in radially outer region of the filter (51).

In other words, in the region (G) between the filter (51) and the casing inner wall (3Ci), the working fluid containing foreign matters detached from the filter (51) can be flowed up (or down) toward a foreign mater discharge opening (31a) provided above (or below) the casing (3C) along the helically arranged baffle plate (9A).

Furthermore, in the present invention, in a case that the blade (6E) is helically configured, although a foreign matter detached from the radially outer surface of the filter (51) is relatively long as like as a fiber and is entangled with an edge portion of the rotary blade, the foreign matter being a fiber or the like can move up along the edge portion of the helical blade (6E) and transfer toward the foreign matter discharge opening (237) being provided above the casing (3).

Therefore, although a relatively long foreign mater like a fiber are entangled with the blade, the foreign matter moves to a position near the foreign matter discharge opening (237) along the edge portion of the blade (6E), and therefore, the foreign matter can be discharged to the outside (of the pump apparatus provided with the filter mechanism according to the present invention) via the discharge opening (237).

In order to prevent the foreign mater like a fiber from getting entangled with the rotary blade, in a case that each blade (6E) is helically configured, it is preferable that the foreign matter discharge opening (237) is provided in an above are of the casing (3).

In a case that the filter mechanism for a pump according to the present invention is applied to, e.g., a machining center (500) or a numerically controlled lathe, it is possible to construct so that a low-pressure flow of a coolant can be ejected by the low-pressure generation unit and a high-pressure flow of the coolant can be ejected by a high-pressure generation unit.

With such constructions, it is not necessary to provide two types of pumps, i.e., a low-pressure pump that generates a low-pressure current and a high-pressure pump that ejects a high-pressure flow, and then, with the above-mentioned constructions, the low-pressure flow and the high-pressure flow of the coolant can be generated with use of a single pump (a coolant pump 101).

Furthermore, when the low-pressure coolant is injected from a nozzle (540) toward an entire workpiece (W), chips which are produced during processing can be removed.

Moreover, by injection of the high-pressure coolant through an end of the tool (520), meshing of chip and workpiece (W) can be prevented.

As a result, a machining accuracy for the workpiece can be improved.

BRIEF DESCRIPTION OF DRAWINGS

FIG. 10 is a cross-sectional view showing a primary part of a fifth embodiment;

FIG. 11 is a view taken along an arrow Y in FIG. 10;

FIG. 12 is a cross-sectional view taken along a line X-X in FIG. 10;

BEST MODE(S) FOR CARRYING OUT THE INVENTION

Embodiments according to the present invention will now be described with reference to the accompanying drawings hereinafter.

A first embodiment according to the present invention will be first described with reference to FIG. 1 to FIG. 5.

Figure 1:
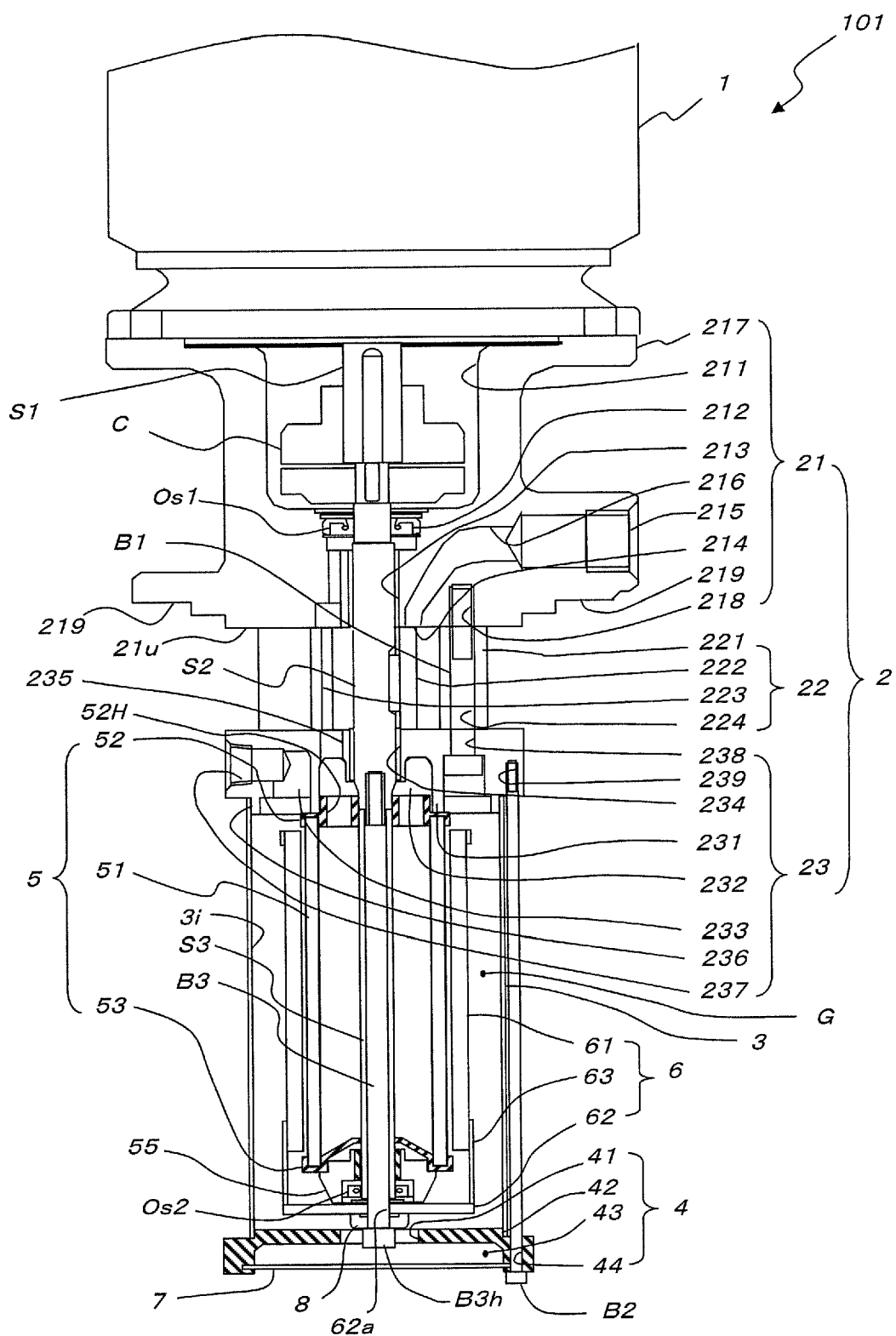
FIG. 1 is a cross-sectional view showing a first embodiment according to the present invention.

In FIG. 1, a coolant pump which is denoted by reference numeral 101 as a whole has a pump drive electric motor 1, a pump unit 2, a filter casing 3, a filter casing lower end closing plate 4, a filter 5, a rotary blade 6, and a strainer plate 7.

The pump unit 2 has an upper housing 21, a high-pressure generation unit (which will be referred to as a "trochoid pump" hereinafter) 22, and a lower housing 23.

In the upper housing 21 are formed a central space portion 211, an oil seal storage portion 212, a shaft through hole 213, an ejection side flow path inlet 214, an ejection opening 215, and an ejection side flow path 216.

A flange 217 is formed on an upper end side of the upper housing 21, and the electric motor 1 is disposed to an upper surface side of the flange 217 by well-known means (e.g., anchor bolts).

A plurality of screw holes 218 where female screws are formed are provided on a lower end surface 21u of the upper housing 21.

In FIG. 1, reference numeral 219 denotes a mounting seat surface configured to mount the coolant pump 101 to a non-illustrated coolant tank.

The central space portion 211 in the upper housing 21 has a shape whose upper end side is opened, and a coupling C is arranged in the central space portion 211. The coupling C connects a rotary shaft S1 of the electric motor 1 to a pump shaft S2.

The oil seal storage portion 212 is formed to be adjacent to the central space portion 211 below the central space portion 211, and it stores an oil seal Os1.

In the upper housing 21, the shaft through hole 213 continuously penetrates through the central space portion 211, the oil seal storage portion 212, and the lower end surface 21u.

In the upper housing 21, the ejection side flow path inlet 214 is opened in the lower end surface 21u, and the ejection opening 215 is opened on the outer peripheral side of the upper housing 21.

The ejection side flow path inlet 214 and the discharge opening 215 communicate with each other through the ejection side flow path 216.

The trochoid pump 22 in the pump unit 2 is arranged to be sandwiched between the upper housing 21 and the lower housing 23. Further, a plurality of through bolts B1 penetrate through the lower housing 23, a casing 221 of the trochoid pump 22, and the upper housing 21, thereby integrally configuring the lower housing 23, the trochoid pump 22, and the upper housing 21.

The trochoid pump 22 has the casing 221, an inner rotor 222, and an outer rotor 223.

The inner rotor 222 is fixed to the pump shaft S2 by well-known means (e.g., keys, pin, or cotters), and it is rotated by the pump shaft S2.

A plurality of bolt through holes 224 are formed in the vicinity of an outer periphery of the casing 221 of the trochoid pump 22. Arrangement of the bolt through holes 224 (a projection position relative to a horizontal surface) coincides with arrangement of the screw holes 218 (a projection position relative to a horizontal surface) formed in the lower end surface 21u of the upper housing 21. That is because this arrangement enables insertion of the same through bolts B1.

In the lower housing 23 in the pump unit 2 are formed a cylindrical protruding portion 231, a central cylindrical space portion 232, an annular space 233, a shaft through hole 234, an intake opening 235 for the trochoid pump 22, a filter casing fitting portion 236, and a low-pressure ejection opening 237.

The central cylindrical space portion 232 is surrounded by the cylindrical protruding portion 231, and an upper portion of the central cylindrical space portion 232 is closed except the intake opening 235 for the trochoid pump 22. That is, the upper portion of the central cylindrical space portion 232 communicates with the intake opening 235 for the trochoid pump 22.

The annular space 233 is formed concentrically with the cylindrical protruding portion 231 and the central cylindrical space portion 232, and it is formed on the radially outer side of the cylindrical protruding portion 231.

The shaft through hole 234 is formed at a central portion of the lower housing 23, i.e., the center of the central cylindrical space portion 232. Moreover, the shaft through hole 234 is pierced in a ceiling portion of the lower housing 23.

The pump shaft S2 is inserted into the shaft through hole 234, and the pump shaft S2 is rotatably pivoted.

An upper end of a filter upper support member 52 is fitted on a radially inner peripheral surface of the cylindrical protruding portion 231 on the lower end side. Additionally, the radially inner peripheral surface of the cylindrical protruding portion 231 and the upper end of the filter upper support member 52 are coupled in a so-called "inside low" state.

The filter casing fitting portion 236 is arranged on the radially outer side of the annular space 233, and the radially outer peripheral surface of the filter casing fitting portion 236 is fitted to the radially inner peripheral surface 3i at the upper end of the filter casing 3. That is, the radially outer peripheral surface of the filter casing fitting portion 236 is coupled with the radially inner peripheral surface 3i at the upper end of the filter casing 3 in the so-called "inside low" state.

The low-pressure ejection opening 237 is opened on the radially outer peripheral side of the lower housing 23 at a relatively upper position. Further, the low-pressure ejection opening 237 communicates with the annular space 233.

Bolt insertion holes 238 are formed at a plurality of positions above the annular space 233, and the bolt insertion holes 238 extend to be parallel to a center axis of the housing 2 (which is not shown in FIG. 1: it extends in an up-and-down direction in FIG. 1). Furthermore, the bolt insertion holes 238 enable the annular space 233 and the upper end surface of the lower housing 23 to communicate with each other.

A plurality of screw holes 239 are formed in the vicinity of the radially outer edge portion of the lower housing 23. Each screw hole 239 has a female screw formed on an upper end portion side thereof. The bolt B2 is inserted into each screw hole 239, and each bolt B2 fixes the filter casing 3 to the lower housing 23.

In FIG. 1, the filter casing lower end closing plate (which will be referred to as a "casing closing plate" hereinafter) 4 is provided to a lower end portion of the coolant pump 101.

The casing closing plate 4 is formed into a shape that a so-called "shallow dish" is turned upside down, and a coolant intake opening 41 having a circular cross section is opened at the center of the casing closing plate 4.

A circular step portion 42 is formed on the upper surface side of the casing closing plate 4, and a radial dimension of the circular step portion 42 is set to be slightly smaller than the radially outer edge of the casing closing plate 4. Additionally, a radially outer peripheral surface (a side surface) of the circular step portion 42 is fitted to the radially inner peripheral surface 3i at the lower end of the filter casing 3.

A space portion 43 is formed in a lower portion of the casing closing plate 4, the strainer plate 7 is provided near an opening portion (a lower opening end in FIG. 1) of the space portion 43, and the strainer plate 7 covers an entire region of the opening portion of the space portion 43. The strainer plate 7 is provided to prevent large foreign matters contained in the coolant in the coolant tank T (see FIG. 18, FIG. 19) from being sucked into the coolant pump 101 shown in FIG. 1. The strainer plate 7 is disposed to the lower side of the casing closing plate 4 by welding, caulking, or any other conventional well-known technique.

A plurality of through holes 44 are formed near a radially outer edge portion of the casing closing plate 4. The number and arrangement (a projection position relative to the horizontal surface) of the through holes 44 coincide with the number and arrangement (a projection position relative to the horizontal surface) of the screw holes 239 formed in the lower housing 23. That is because each bolt B2 can be inserted into each screw hole 239 via each through hole 44 based on this construction.

At the time of disposing the filter casing 3 to the lower housing 23, the fitting portion 236 of the lower housing 23 is fitted to (the radially inner peripheral surface 3i of) the upper end of the filter casing 3. Furthermore, the circular step portion 42 of the casing closing plate 4 is fitted to (the radially inner peripheral surface 3i of) the lower end of the filter casing 3.

Moreover, the casing closing plate 4 is rotated, and positional adjustment is carried out so that the center of each through hole 44 in the casing closing plate 4 can be matched with (aligned on a straight line with) the center of each screw hole 239 in the lower housing 23.

Additionally, each bolt B2 is inserted into each through hole 44 and each screw hole 239, and predetermined fastening torque is applied. As a result, the filter casing 3 and the casing closing plate 4 can be fastened to the lower housing 23.

The filter 5 is constituted of a filter main body (which will be also referred to as a "filter element" hereinafter) 51, a filter upper support member 52, and a filter lower support member 53.

The filter element 51 is a cylindrical member having a predetermined thickness in the radial direction. A cylindrical space G having an annular cross section is formed between the radially outer peripheral surface of the filter element 51 and the radially inner peripheral surface 3i of the filter casing 3.

The filter upper support member 52 is provided above the filter element 51 in FIG. 1, and it is shown with hatching. The filter upper support member 52 engages with the radially inner peripheral surface of the cylindrical protruding portion 231 of the lower housing 23. Therefore, the filter upper support member 52 is arranged in the central cylindrical space portion 232.

The filter element 51 is held by the filter upper support member 52 and the filter lower support member 53. The filter lower support member 53 is provided below the filter element 51 in FIG. 1, and it is shown with hatching.

A shaft through hole which is not clearly shown in FIG. 1 is formed at the center of the filter upper support member 52, and a lower end of the pump shaft S2 and an upper end of a cylindrical rotary shaft S3 penetrate through the shaft through hole.

A plurality of through holes 52H are formed in the filter upper support member 52. A region of the filter element 51 on the radially inner side communicates with the central cylindrical space portion 232 and the intake opening 235 for the trochoid pump 22 in the lower housing 23 via the through holes 52H.

In FIG. 1, an oil seal storage member 55 is provided below the filter lower support member 53, and an oil seal Os2 is provided to the oil seal storage member 55.

A through hole is formed at the center of the oil seal storage member 55, and the cylindrical rotary shaft S3 is rotatably pivoted in the through hole. Furthermore, when the cylindrical rotary shaft S3 rotates, the rotary blade 6 rotates or turns.

The rotary blade 9 includes a plurality of (e.g., two) blades 61, a horizontal member 62, and a vertical support member 63 that supports the blades 61.

The horizontal member 62 is formed into a rectangular plate shape as a whole and extends in a diametric direction of the coolant pump 101, and a circular seat surface is provided in a central region of the horizontal member 62 along the diametric direction (see FIG. 2 to FIG. 5).

The blades 61 (two in the illustrated example) are fixed and provided at both end portions of the horizontal member 62 in the diametric direction by the vertical support member 63 in such a manner that they are orthogonal to the horizontal member 62.

A through hole 62a is formed in a central region (the center of the circular seat surface of the horizontal member 62) of the horizontal member 62 in the diametric direction.

The horizontal member 62 is fixed to the cylindrical rotary shaft S3, the rotary blade 6 integrally rotates with an inner rotor 223 of the trochoid pump 22, and the blades 61 of the rotary blade 6 move in the circumferential direction. In this specification, the movement of the blades 61 in the circumferential direction may be represented as "rotation" or "turning" in some cases.

To integrally rotate the rotary blade 6 with the inner rotor 223 of the trochoid pump 22, an insertion bolt B3 having a long shaft portion and a thick annular washer 8 are provided.

The insertion bolt B3 penetrates through the washing 8 via the through hole 62a at the center of the horizontal member 62, and it is inserted through the cylindrical rotary shaft S3. Additionally, a male screw at an end (an upper end in FIG. 1) of the insertion bolt B3 is screwed into the female screw formed at the lower end of the pump shaft S2.

The washer 8 is placed between a back side (an upper surface in FIG. 1) of a bolt head B3h and a lower surface of the horizontal member 62 of the rotary blade 6, and it exercise a locking function when the bolt head B3h of the insertion bolt B3 is fastened with predetermined torque. Further, when the insertion bolt B3 is fastened, the cylindrical rotary shaft S3 and the horizontal member 62 of the rotary blade 6 are coupled with the pump shaft S2.

In FIG. 1, rotation of the electric motor 1 is transmitted to the rotary shaft S1 and the pump shaft S2, and it is also transmitted to the cylindrical rotary shaft S3 coupled with the pump shaft S2 and the rotary blade 6. Therefore, the rotary blade 6 rotates together with the trochoid pump 22.

Figure 2:
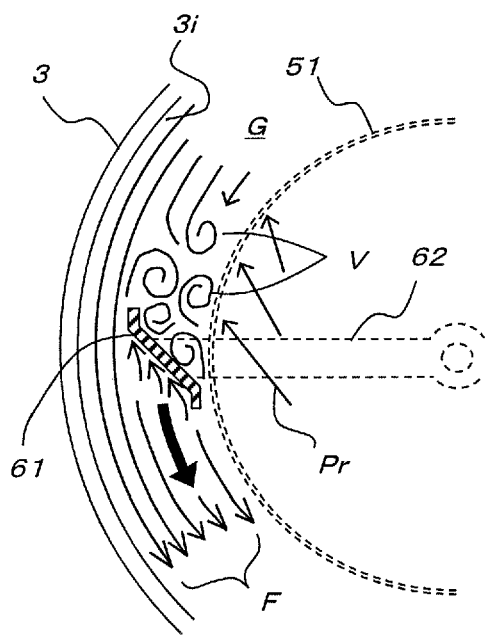
FIG. 2 is an explanatory view showing a function of a rotary blade in FIG. 1.
Figure 3:
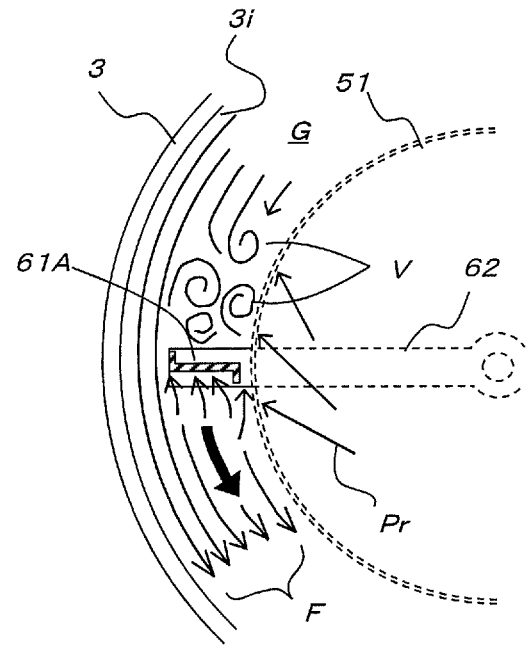
FIG. 3 is an explanatory view showing a shape of the rotary blade applied when viscosity of a working fluid is low an a working state thereof.

An example of the rotary blade 6 is shown in FIG. 2 (a first embodiment) and FIG. 3 (a first modification of the first embodiment).

In FIG. 2 (the first embodiment), when the blades 61 of the rotary blade 6 move and turn in the circumferential direction, a flow F in the circumferential direction is generated in an annular region G surrounded by the filter casing 3 and the filter element 51.

In the example (the first embodiment) shown in FIG. 2, a cross-sectional configuration of each blade 61 of the rotary blade 6 is inclined relative to a streamline of a flow F in such a manner that the radially inner side becomes a downstream side of the flow F.

On the other hand, in the example (the first modification of the first embodiment) in FIG. 3, a blade 61A of the rotary blade 6 is arranged to be orthogonal to the flow F.

In FIG. 2, both ends of the cross section of the blade 61 are bent at an obtuse angle. On the other hand, in FIG. 3, both ends of the cross section of the blade 61A are bent at a right angle.

Although the flow F is generated by turning of each blade 61, a turning speed of the flow F is lower than a rotating speed of the blade 61 due to viscosity resistance of the filter element 51 and the inner peripheral surface 3i of the filter casing 3. A flow that detaches foreign matters is generated behind the blade 61 owing to a speed difference between the rotating speed of the blade 61 and the turning speed of the flow F.

The example of FIG. 2 is applied to a case where viscosity of a working fluid (the coolant) is high. When the blade 61 is inclined relative to the streamline of the flow F, a pressure receiving area of the blade 61 with respect to the highly viscous coolant is reduced, and resistance of the blade 61 is decreased.

On the other hand, the example of FIG. 3 (the first modification) is applied to a case where the coolant has low viscosity. When the blade 61A is arranged to be orthogonal to the streamline of the flow F of the coolant having the low viscosity, a pressure receiving area of the blade 61A with respect to the coolant having the low viscosity is increased, and a swirl flow (a vortex) can be easily produced.

In FIG. 2 and FIG. 3, the blades 61 and 61A are explained as different members.

However, in the illustrated embodiment, the blades 61 and 61A may be constituted of the same member, and the inclination of each of the blades 61 and 61A relative to the streamline of the flow F may be changed in accordance with the viscosity of the coolant. That is, an angle formed between the vertical member 63 (see FIG. 1) of the rotary blade 6 and the blade 61 or 61A can be adjusted.

If such a construction is applied, the same rotary blade (blades) can be used with respect to a plurality of types of coolants.

As shown in FIG. 2 and FIG. 3, each swirl flow (a vortex) V is generated in the annular region G on the back surface side (the upstream side) of the blade 61 or 61A in a flow direction when the blade 61 or 61A stirs a fluid.

When a turbulent flow or a vortex is generated behind the rotary blade (the blade 61 or 61A), foreign matters adhering to the radially outer side surface of the filter element 51 are sucked to the radially outer side (the annular region (the region denoted by reference sign G in FIG. 1) surrounded by the filter casing 3 and the filter element 51). As a result, the foreign matters (refuse) are detached (toward the radially outer side) from the radially outer side surface of the filter element 51.

The radially inner region of the filter element 51 communicates with the intake opening 235 of the trochoid pump 22 via the through hole 52H of the filter upper support member 52, and an inlet pressure of the trochoid pump 22 constantly acts. Therefore, force for sucking toward the radially inner side of the filter element 51 constantly acts on the working fluid that is present in the radially outer region of the filter element 51.

The working fluid (the coolant) that has passes through and filtered by the filter element 51 is taken into the trochoid pump 22 through the radially inner region of the filter element 51, the through holes 52H of the filter upper support member 52, and the intake opening 235 of the trochoid pump 22. The coolant 235 pressurized by the trochoid pump 22 is ejected from the ejection opening 215 as a high-pressure coolant through the ejection side flow path inlet 214 and the ejection side flow path 216. Furthermore, the coolant that is present in the annular region G on the radially outer side of the filter element 51 is ejected as a low-pressure coolant from the low-pressure ejection opening 237.

The foreign matters (refuse) detached from the radially outer side surface of the filter element 51 can be discharged to the outside of the coolant pump 101 from the low-pressure ejection opening 237 by the flow F in the circumferential direction that is generated in the annular region G when the rotary blade 6 rotates.

Therefore, a diameter of the annular space 233 communicating with the low-pressure ejection opening 237 must be sufficiently larger than a diameter of the coolant intake opening 41 of the lower end closing plate 4 of the filter casing 3. In other words, the diameter of the coolant intake opening 41 must be sufficiently smaller than the diameter of the annular space 233. That is because, when the diameter of the coolant intake opening 41 is large, the coolant sucked into the coolant pump 101 falls to the outside of the coolant pump 101 from the intake opening 41.

In addition, at the time of using the coolant pump 101, it is preferable for the low-pressure ejection opening 237 to be immersed in the working fluid (a liquid). This prevents air from being taken from the low-pressure ejection opening 23 due to suction force of the trochoid pump 22.

Figure 4:
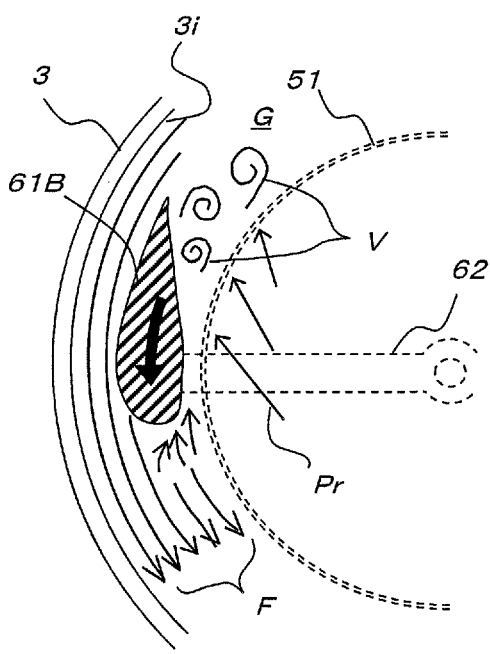
FIG. 4 is an explanatory view showing a rotary blade different from those shown in FIG. 2 and FIG. 3 and a working state thereof.

In a second modification of the first embodiment shown in FIG. 4, an example where a cross-sectional configuration of a blade 61B is formed into a blade-like stream-line shape. Like the example depicted in FIG. 2 (the first embodiment), the example shown in FIG. 4 is applied to a situation where the working fluid (e.g., the coolant) has high viscosity. Moreover, foreign matters (refuse) can be detached (toward the radially outer side) from the radially outer side surface of the filter element 51 by lift or a pressure difference without producing a turbulent flow behind a blade surface, which is advantageous in terms of energy saving even if the number of revolutions is high.

In the modification in FIG. 4, structures or functions and effects other that those described above are the same as the embodiment shown in FIG. 1 to FIG. 3.

Figure 5:
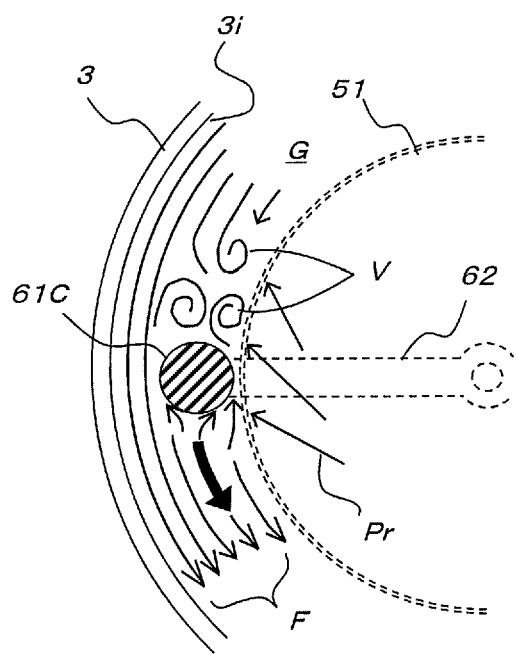
FIG. 5 is an explanatory view showing still another rotary blade and a working state thereof.

FIG. 5 shows a third modification of the first embodiment. In the example of FIG. 5, a blade 61C has a circular cross-sectional configuration.

The third modification in FIG. 5 is applied to a situation where the working fluid has relatively low viscosity.

Structures or functions and effects other than those described above in the third modification shown in FIG. 5 are the same as the first embodiment (including the modifications) shown in FIG. 1 to FIG. 4.

It is to be noted that each of FIG. 2 to FIG. 5 shows a blade cross section to be larger than an actual dimension in order to clarify the cross-sectional configuration of the blade. Moreover, it is preferable to apply the cross-sectional configuration of the blade shown in each of FIG. 2, FIG. 3, and FIG. 5 when the number of revolutions of the rotary blade 6 is as low as several hundred rpm or when the working fluid has low viscosity like air and it is a light fluid.

According to the first embodiment (including the modifications) shown in FIG. 1 to FIG. 5, when the blade 61, 61A, 61B, or 61C between the filter element 51 and the casing inner wall surface 3i rotates or turns, a swirl flow F (see FIG. 2 to FIG. 5) of the working fluid is generated in the annular space G (see FIG. 1) between the filter element 51 and the casing inner wall 3i. This swirl flow F is effective in giving centrifugal force that discharges foreign matters from the low-pressure ejection opening 237, but it reduces a speed difference from the blade 61, 61A, 61B, or 61C (FIG. 2 to FIG. 5) and decreases a foreign matter detachment effect.

However, the swirl flow F becomes slower than the blade 61, 61A, 61B, or 61C due to viscosity resistance of the filter element 51 and the inner peripheral surface 3i of the filter casing 3, and a flow that moves on the blade surface toward the rear side is generated.

When the rotating blade 61, 61A, 61B, or 61C passes in the annular space G between the filter element 51 and the casing inner wall 3i, a cross-sectional area (a flow path cross-sectional area) that the working fluid flows toward the rear side of the blade is smaller than that in a case where the rotating blade 61, 61A, 61B, or 61C does not pass.

Moreover, since a flow velocity is raised in proportion as the cross-sectional area is reduced, a relative flow velocity of the working fluid with respect to the blade 61, 61A, 61B, or 61C is higher in a region where the rotating blade 61, 61A, 61B, or 61C passes than in a region where the blade 61, 61A, 61B, or 61C does not pass.

Since a pressure of the working fluid is low in the region where the flow velocity is high based on Bernoulli's theorem, when the rotating blade 61, 61A, 61B, or 61C passes, a pressure in this region is reduced. As a result, a pressure in the region where the rotating blade 61, 61A, 61B, or 61C passes is lower than a pressure in the radially inner region of the filter 5, and a differential pressure is generated. That is, when the blade 61, 61A, 61B, or 61C passes, a differential pressure is generated between the radially outer region and the radially inner region of the filter element 51.

Based on this differential pressure, force Pr (see FIG. 2 to FIG. 5) acting from the radially inner side toward the radially outer side of the filter element 51 is generated.

This force Pr enables removing (detaching) foreign matters adhering to the radially outer surface of the filter element 51 from the filter element 51.

In particular, in a case that the cross-sectional configuration of the rotating blade 61B is a blade-like shape (the blade 61B: see FIG. 4), the force Pr acting from the radially inner side toward the radially outer side is apt to be generated, and the force Pr itself becomes large.

As shown in FIG. 2 to FIG. 5, each turbulent flow is generated behind (behind the blade in the turning direction) the rotating or turning blade 61, 61A, 61B, or 61C, and a vortex V is produced.

The blade 61, 61A, 61B, or 61C passes a position very close to the radially outer surface of the filter element 51. Therefore, rotating force caused due to the turbulent flow and the vortex V generated behind the blade 61, 61A, 61B, or 61C produces force (lift) acting toward the radially outer side, and this force exercises a function of detaching foreign matters adhering to the radially outer surface of the filter element 51.

According to the embodiment shown in FIG. 1 to FIG. 5, when the blade 61, 61A, 61B, or 61C passes a position very closer to the radially outer surface of the filter element 51, the force acting from the radially inner side toward the radially outer side of the filter element 51 is produced by the force Pr caused by the differential pressure or the force (lift) caused due to the turbulent flow and the vortex V behind the blade 61, 61A, 61B, or 61C in the turning direction.

Since this force enables detaching foreign matters adhering to the radially outer surface of the filter element 51 into the radially outer region, the foreign matters can be prevented from adhering to the surface of the filter element 51.

On the other hand, according to the embodiment described with reference to FIG. 1 to FIG. 5, since the radially inner region of the filter element 51 communicates with the intake opening 235 of the trochoid pump 22 via the through hole 52H of the filter upper support member 52, an inlet pressure of the trochoid pump 22 always acts. Therefore, force sucking toward the radially inner side of the filter element 51 constantly acts on the working fluid that is present in the radially outer region of the filter element 51.

That is, in the coolant pump 101 shown in FIG. 1 to FIG. 5, a flow of the working fluid from the radially outer side toward the radially inner side of the filter element 51 is always present.

As a result, according to the embodiment shown in FIG. 1 to FIG. 5, there can be obtained functions and effects of assuredly filtering the working fluid supplied to the intake opening 235 of the trochoid pump 22, supplying the clean working fluid to the trochoid pump 22, detaching foreign matters adhering to the radially outer surface of the filter element 51, and maintaining filtration performance.

A second embodiment according to the present invention will now be described hereinafter with reference to FIG. 6.

Figure 6:
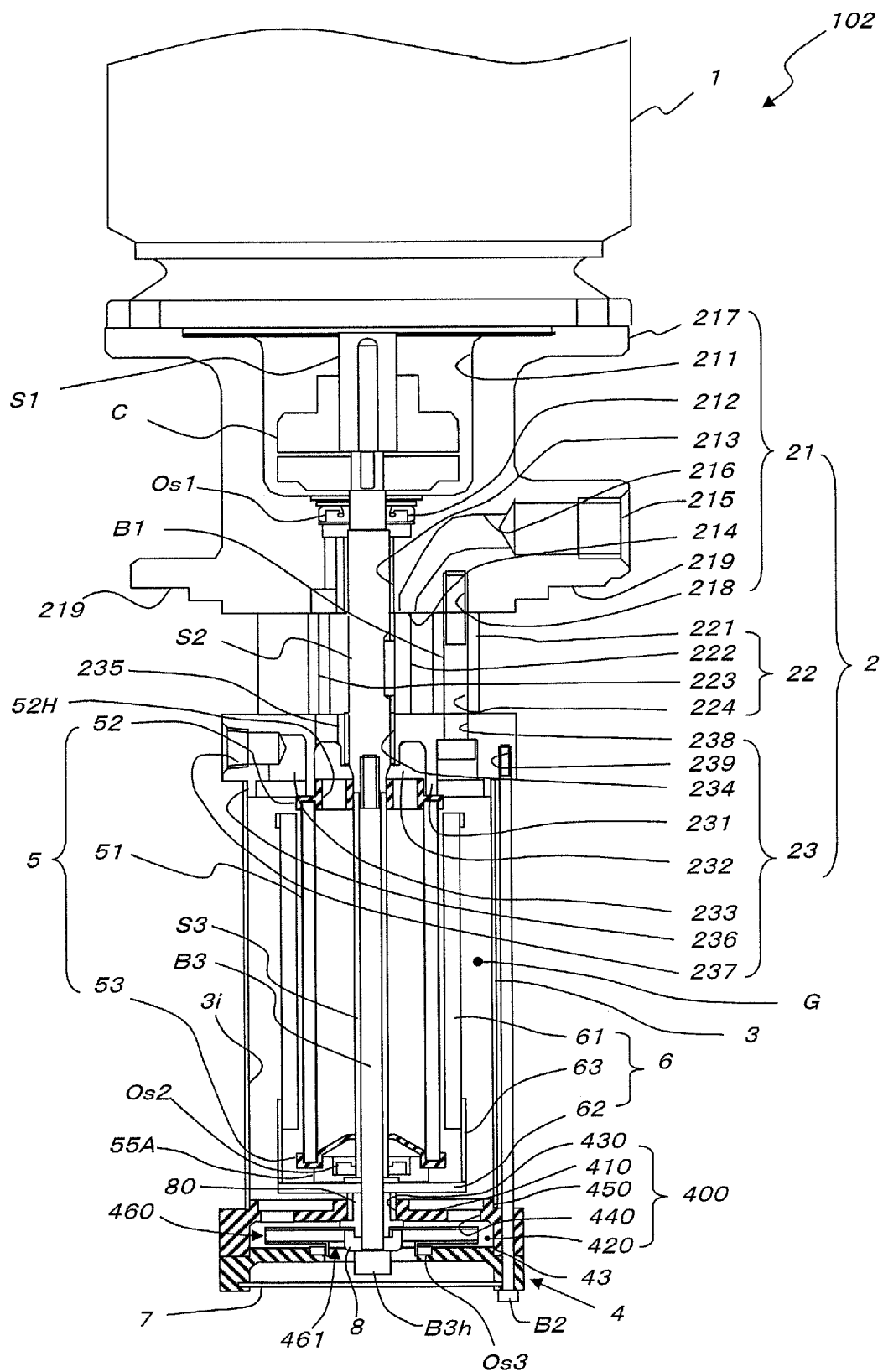
FIG. 6 is a cross-sectional view showing a second embodiment.

In FIG. 6, a coolant pump to which the second embodiment is applied is denoted by reference numeral 102 as a whole, and an impeller casing 400 including an impeller 460 is arranged in a region between a filter casing 3 and a casing closing plate 4. Further, the second embodiment shown in FIG. 6 is different from the coolant pump 101 to which the first embodiment shown in FIG. 1 is applied in that the impeller 460 is provided between the filter casing 3 and the casing closing plate 4.

A difference of the coolant pump 102 from the first embodiment shown in FIG. 1 to FIG. 5 will be mainly described with reference to FIG. 6.

In FIG. 6, the impeller casing 400 is fitted to an inner peripheral surface 3i at a lower end of the filter casing 3.

The impeller casing 400 has a rotator shape as a whole, and it includes a hood portion 410, a cylindrical lower space 420, a central through hole 430, a plurality of fluid passage holes 440, and a casing fitting portion 450.

The central through hole 430 is formed at the center of the hood portion 410.

The plurality of fluid passage holes 440 are formed near an outer periphery of the impeller 460 in the hood portion 410 along the circumferential direction at an equal pitch.

The impeller 460 is rotatably arranged in the cylindrical lower space 420.

The casing fitting portion 450 is constituted of an annular protrusion formed on the upper surface of the hood portion 410. A radially outer end surface (an outer peripheral surface) of the casing fitting portion 450 is fitted to an inner peripheral surface 3i at the lower end of the filter casing 3.

The impeller 460 is coupled with a cylindrical rotary shaft S3, and it rotates together with a trochoid pump 22.

A pressing member 80 is provided above the impeller 460, and a working fluid (coolant) intake opening 461 is formed below the impeller 460.

The coolant taken in from the working fluid intake opening 461 below the impeller 460 is pressurized by the impeller 460, ejected to the radially outer side of the impeller 460, and flows into an annular space G between a filter element 51 and a casing inner wall 3i through the plurality of fluid passage holes 440.

To couple the impeller 460 with the cylindrical rotary shaft S3, a washer 8 and a cylindrical intermediate pressing member 80 are provided. The cylindrical intermediate pressing member 80 has an annular flange formed on an outer periphery of a cylindrical member.

An upper end of the cylindrical member of the cylindrical intermediate pressing member abuts on a lower surface of a horizontal member 62 of a rotary blade 6. Furthermore, a discoid member of the radially central portion of the impeller 460 is fixed so as to be held by a flange of the cylindrical intermediate pressing member 80 and a washer 8.

When a bolt head B3*h* of an insertion bolt B3 is fastened with predetermined torque and a male screw at an end (an upper end in FIG. 6) of the insertion bolt B3 is screwed to a female screw formed at a lower end of a pump shaft S2, the impeller 460 is fixed to the horizontal member 62 of the rotary blade 6 through the flange of the cylindrical intermediate pressing member 80 and the washer 8.

As described with reference to FIG. 1, since the horizontal member 62 of the rotary blade 6 is coupled with the cylindrical rotary shaft S3, the impeller 460 is also coupled with the cylindrical rotary shaft S3 through the horizontal member 62, the flange of the cylindrical intermediate pressing member 80, and the washer 8. As a result, the impeller 460 can integrally rotate with the rotary blade 6 and the trochoid pump 22.

In the illustrated embodiment, the impeller 460 may be of a so-called "semi-open" type or a so-called "closed" type.

Moreover, although not clearly shown, an axial flow pump or any other rotary pump may be adopted in place of the impeller.

According to the second embodiment shown in FIG. 6, the impeller 460 is provided in a region between the filter casing 3 and the casing closing plate 4, and the working fluid (the coolant) can be pressed into an annular space G between a filter element 51 and a casing inner wall 3*i* through the fluid passage holes 440 by rotative force of the impeller 460.

Therefore, as force that supplies the working fluid into the coolant pump 102, in addition to suction force of the trochoid pump 22, a pressure applied by the impeller 460 can be also used.

Additionally, as force that discharges from a low-pressure ejection opening 237 of the lower housing 23 foreign matters detached from the filter element 51, a pressure applied by the impeller 460 is used. As a result, the foreign matters detached from the filter element 51 can be efficiently discharged from the low-pressure ejection opening 237.

Further, even if the entire coolant pump 102 is not immersed in the working fluid, the working fluid can be sucked by the impeller 460 at the time of activation as long as the impeller 460 and the impeller casing 400 are immersed.

Structures, functions, and effects other than those described above in the second embodiment shown in FIG. 6 are the same as the first embodiment explained with reference to FIG. 1 to FIG. 5.

In the first embodiment and the second embodiment shown in FIG. 1 to FIG. 6, a speed difference between a turning speed of the working fluid and a rotating speed of each blade 61, 61A, 61B, or 61C becomes maximum at the time of activation, and hence an effect of detaching the foreign matters from the surface of the filter element 51 becomes large at the time of activation. Therefore, in the first embodiment and the second embodiment shown in FIG. 1 to FIG. 6, a method having a high frequency of turning ON and OFF the pump is desirable.

A third embodiment according to the present invention will now be described with reference to FIG. 7 and FIG. 8.

A coolant pump to which a filter mechanism according to the third embodiment is applied is denoted by reference numeral 103 as whole.

Figure 7:
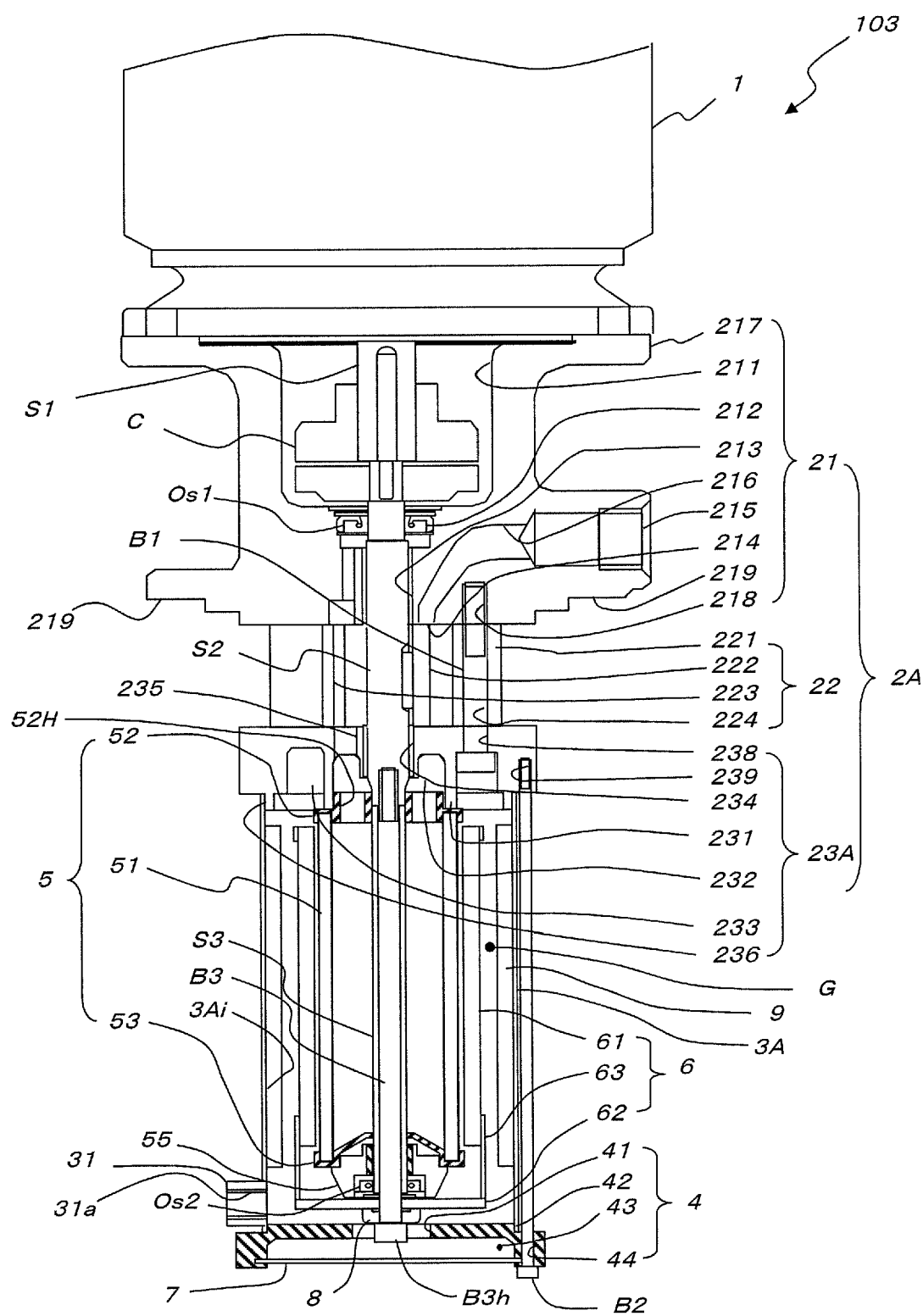
FIG. 7 is a cross-sectional view showing a third embodiment.

A coolant pump 103 in FIG. 7 is different from the coolant pump 101 shown in FIG. 1 in that baffle plates (fins) 9 are provided at a plurality of positions on an inner peripheral surface 3Ai of a filter casing 3A.

Constructions being different from the first embodiment will be mainly described hereinafter with reference to FIG. 7.

In FIG. 7, the plurality of baffle plates (so-called "fins") 9 are provided on the inner peripheral surface 3Ai of the filter casing 3A of the coolant pump 103 along a circumferential direction at an equal pitch, and each baffle plate 9 extends to be parallel to a central axis of the filter casing 3A.

Here, in the illustrated embodiment, a function of detaching foreign matters adhering to an outer surface of a filter element 51 (toward the radially outside) is excellently exercised in proportion as a speed difference between a turning speed of a working fluid and a rotating speed of each blade 61 is large.

Figure 8:
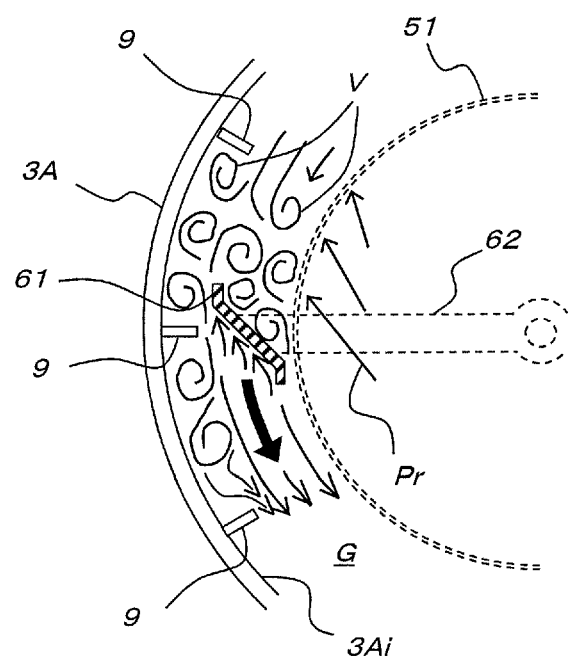
FIG. 8 is an explanatory view showing a function of the third embodiment.

As shown in FIG. 8 illustrating a horizontally cut cross section of the filter casing 3A in FIG. 7, a direction along which each blade 61 rotates (a counterclockwise direction) is equal to a direction (the counterclockwise direction) along which the working fluid turns in an annular space G between the filter element 51 and the filter casing inner wall 3Ai. FIG. 8 shows that the direction along which the blade 61 rotates is the same as the direction along which the working fluid turns in the space (or a region) G, and a cross-sectional configuration of the blade 61 is not restricted to that shown in FIG. 8. It is to be noted that a cross-section of the blade 61 is shown to be larger than an actual dimension in FIG. 8.

Thus, in the first embodiment shown in FIG. 1 to FIG. 5, an effect of detaching foreign matters adhering to a radially outer surface of the filter element 51 is most prominently exercised immediately after rotation of the blade 61.

However, in the first embodiment shown in FIG. 1 to FIG. 5, when an appreciable time passes after start of rotation of the blade 61, a speed difference between the turning speed of the working fluid and the rotating speed of the blade 61 becomes small, and an effect of detaching foreign matters adhering to the radially outer surface of the filter element 51 becomes small.

On the other hand, in FIG. 7, since the baffle plates 9 are provided on the filter casing inner wall surface 3Ai, the turning speed of the working fluid in the annular space G is reduced by the baffle plates 9. As a result, even if the appreciable time passes after start of rotation of the blade 61, the speed difference between the turning speed of the working fluid and the rotating speed of the blade 61 is not reduced.

Additionally, since the baffle plates 9 are provided, each vortex V is apt to be generated in a region between the baffle plates 9 and 9, which are adjacent to each other, near the filter casing inner peripheral surface 3Ai. With each vortex, a turbulent flow or a vortex is apt to be generated behind the blade 61 in a moving direction (an upstream side of a flow of the working fluid), and force that moves foreign matters adhering to the radially outer surface of the filter element 51 to the radially outer side also becomes large.

Therefore, according to the third embodiment shown in FIG. 7, a function of detaching foreign matters adhering to the radially outer surface of the filter element 51 can be excellently exercised even at timing other than that immediately after turning of the blade 61.

In FIG. 7, a cylindrical boss 31 is secured near a lower end of the filter casing 3A so as to penetrate through the filter casing 3A. A low-pressure ejection opening 31a having a female screw formed therein is formed at the center of the cylindrical boss 31.

In other words, as compared with the low-pressure ejection opening 23 formed in the lower housing 23 in FIG. 1 and FIG. 6, the low-pressure ejection opening 31a in the third embodiment of FIG. 7 is formed at a lower position.

Since the baffle plates 9 are provided, in the region G between the radially outer peripheral surface of the filter element 51 and the radially inner peripheral surface 3i of the filter casing 3, a turning speed of a swirl flow F of the working fluid is lowered, and centrifugal force acting on foreign matters detached from the outer peripheral surface of the filter element 51 is decreased by the swirl flow F. Therefore, the foreign matters detached from the outer peripheral surface of the filter element 51 are not discharged from a discharge opening formed at a relatively high position like the low-pressure ejection opening 237 (see FIG. 1 and FIG. 6).

Therefore, in the third embodiment shown in FIG. 7, it is desirable to arrange the low-pressure ejection opening 31a used for foreign matter discharge at a lower position.

It is to be noted that the low-pressure ejection opening 31a is arranged at a lower position in FIG. 10.

For example, a relative positional relationship between a position of an ejection opening (a high-pressure side ejection opening) 215 of the trochoid pump 22 and the low-pressure ejection opening 31 (31a) is restricted depending on how the coolant pump is used, and a position of the low-pressure ejection opening 31a (a discharge opening from which the foreign matters detached from the filter element 51 are discharged) must be formed at a lower position (than a position of the low-pressure ejection opening 237 shown in FIG. 1 and FIG. 6) in some cases. That is because, if a pump intake opening and the low-pressure ejection opening 31a are immersed in the working fluid (a liquid), the working fluid (the liquid) can be self-sucked by suction force of the trochoid pump 22. Therefore, in the embodiment shown in FIG. 7 or FIG. 10, in regard to activation of the pump, at least the low-pressure ejection opening 31a is immersed.

Figure 9:
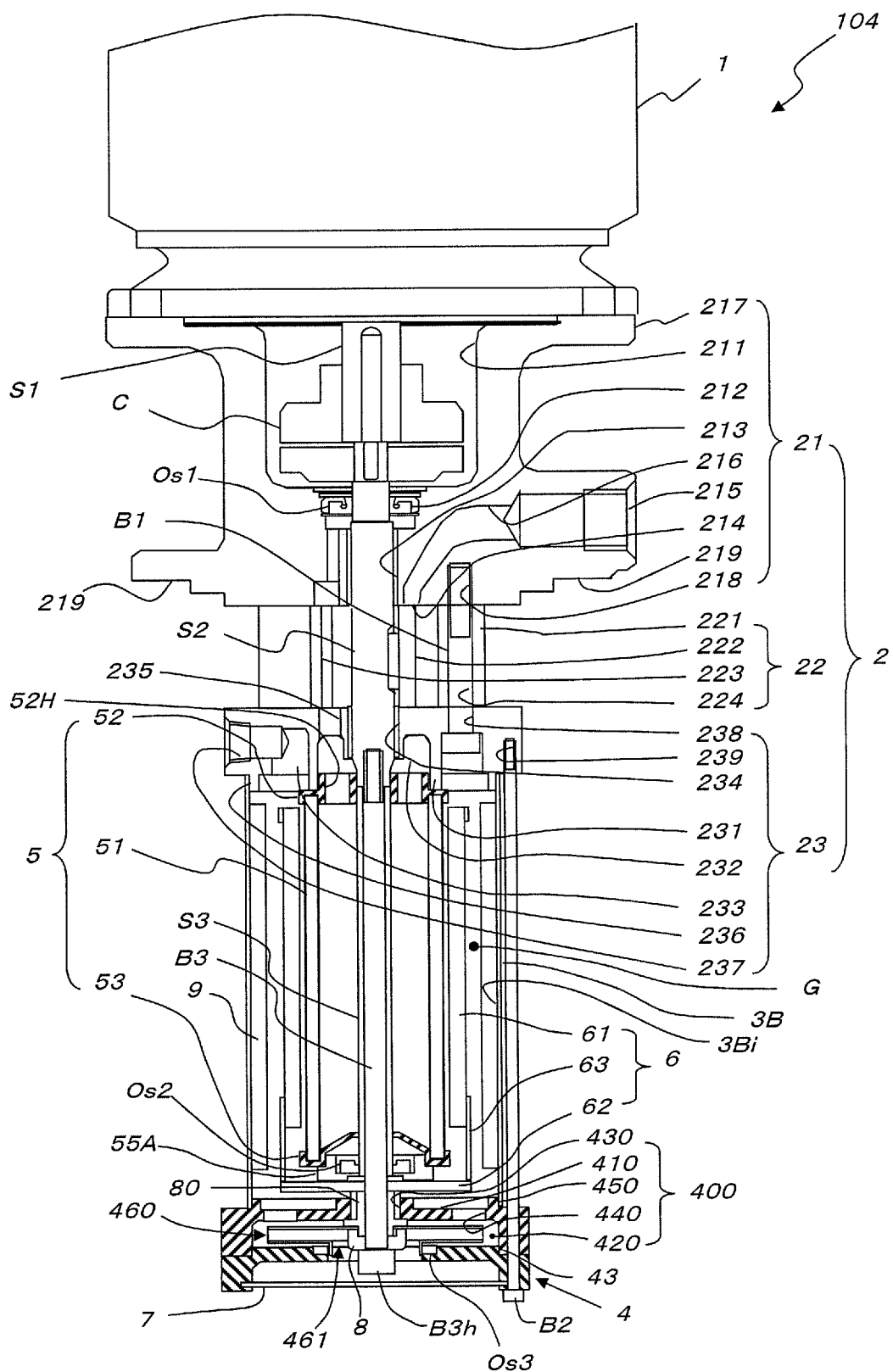
FIG. 9 is a cross-sectional view showing a fourth embodiment.

In the coolant pump shown in FIG. 1 or FIG. 6 or the coolant pump shown in FIG. 9, a position of the low-pressure ejection opening can be set to a lower position (than positions shown in FIG. 1, FIG. 6, and FIG. 9) as shown in FIG. 7 or FIG. 10. In this case, as will be described later with reference to FIG. 10 to FIG. 15, it is preferable that each baffle plate is helically formed and the working fluid containing foreign matters flows down along the helix.

According to the third embodiment shown in FIG. 7 and FIG. 8, since a turning speed of the swirl flow F is suppressed in the region G by the baffle plates 9, a speed difference between the turning speed of the swirl flow F and a rotating speed of a rotary blade 6 can be maintained at a large value, and an effect of detaching foreign matters from the filter element 51 can be continuously exercised at any timing other than activation of the pump 103. Therefore, the third embodiment shown in FIG. 7 and FIG. 8 can be naturally applied in case of repeating ON and OFF, and it can be also applied in case of continuously operating the pump 103.

Structures, functions, and effects described above in the third embodiment with reference to FIG. 7 and FIG. 8 are the same as those in the first embodiment.

A fourth embodiment according to the present invention will now be described with reference to FIG. 9.

In FIG. 9, a coolant pump to which a filter mechanism according to a fourth embodiment is applied is denoted by reference numeral 104 as a whole.

The coolant pump 104 is different from the coolant pump 103 in FIG. 7 in that an impeller 460 is provided at a lower intake opening.

In other words, the coolant pump 104 to which the fourth embodiment shown in FIG. 9 is applied is an embodiment that the impeller 460 is provided at the intake opening and baffle plates 9 are provided on a filter casing inner peripheral surface 3Bi with respect to the coolant pump 101 to which the first embodiment in FIG. 1 is applied.

According to the fourth embodiment shown in FIG. 9, since an impeller housing 400 and the impeller 460 provided therein are formed, as force for sucking a coolant into the coolant pump 104, rotating force (pressurization) caused by the impeller 460 is added in addition to an inlet pressure of the trochoid pump 22. As a result, the trochoid pump 22 or the coolant pump can be further miniaturized. Furthermore, at the time of circulating a coolant for a working machine, energy consumption can be suppressed, and a running cost can be also decreased.

Moreover, since the coolant is positively pressed into the coolant pump 104 by the impeller 460, even if a speed of a swirl flow F is lowered by the baffle plates 9, foreign matters are efficiently discharged from the discharge opening provided at a relatively high position. Therefore, as different from the low-pressure discharge opening 31a shown in FIG. 7, a low-pressure ejection opening 237 used for discharge of foreign matters can be provided at a relatively high position as shown in FIG. 9 in the fourth embodiment.

Structures, functions, and effects other than those descried above in the fourth embodiment are equal to the embodiments shown in FIG. 1 to FIG. 8.

A fifth embodiment according to the present invention will now be described with reference to FIG. to FIG. 15.

In FIG. 10 to FIG. 15, in a coolant pump to which the fifth embodiment of the filter mechanism according to the present invention is applied, each baffle plate 9 shown in FIG. 7 is twisted helically (in more detail, so as to constitute part of the helix).

A structure of the fifth embodiment shown in FIG. 10 to FIG. 15 different from the third embodiment shown in FIG. 7 and FIG. 8 will be mainly explained hereinafter.

FIG. 10 shows a longitudinal cross section including a filter 5, a rotary blade 6D, a plurality of baffle plates 9A, and a filter casing 3C having the baffle plates 9A provided therein.

Further, FIG. 11 is a view taken along an arrow Y in FIG. 10, and FIG. 12 is a cross-sectional view taken along a line X-X in FIG. 10. However, in FIG. 12, the filter 5 and the rotary blade 6D are omitted.

In FIG. 12, reference sign 9At denotes an upper end surface of each baffle plate 9A. As described above, the baffle plate 9A is helically twisted (so as to constitute part of the helix). In the fifth embodiment, the helix (or part of the helix) constituted by the baffle plate 9A is formed in such a manner that a swirl flow of a working fluid in a radially outer region G of the filter 5 flows toward the lower side in FIG. 10 along the helix.

In FIG. 11, a blade 61D of the rotary blade has a blade cross section that is slightly bent at a central portion. In the example shown in FIG. 11, a bend angle θ in the blade cross section is 5° that is formed toward the radially outer side.

Figure 13:
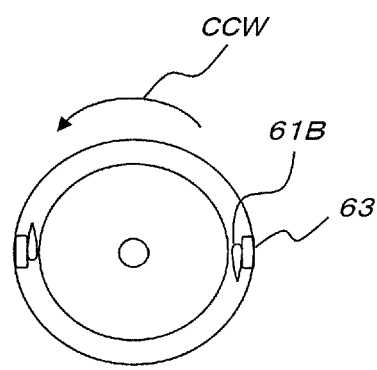
FIG. 13 is a view that shows a construction different from that in FIG. 11 and is associated with FIG. 11.

Each of FIG. 11 and FIG. 13 shows a preferred cross-sectional configuration of each blade. Moreover, in each of FIG. 11 and FIG. 13, a rotating direction of each of the blades 61D and 61B of the rotary blade is denoted by an arrow CCW.

In the example of FIG. 11 (a blade cross section is bent 5° at the center of a board width), the blade 61D is provided at a position that is approximately 1 to 2 mm apart from a surface of a filter element 51. That is because, when the blade 61D is arranged at a position very close to the surface of the filter element 51 (the position that is approximately 1 to 2 mm apart from the surface of the filter element 51), force generated due to a speed difference from an ambient fluid at the time of turning the blade 61D and a differential pressure generated based on Bernoulli's theorem can facilitate detachment of refuse from the filter surface.

Here, it is preferable to appropriately change the bend angle θ shown in FIG. 11 in accordance with viscosity or specific gravity of a working fluid. For example, in case of an oil whose specific gravity is lighter than water and whose viscosity is not low (e.g., VG 32: the ISO standard), a circumferential length of the blade 61D is set to 20 mm, and the bend angle is set to 5°. On the other hand, in case of an aqueous coolant, it is preferable to set the circumferential length of the blade 61D to 15 mm and set the bend angle to 0 to −5° (5° toward the radially outer side).

FIG. 13 shows a modification using the blade 61B having a blade-like cross-sectional configuration as like as constructions shown in FIG. 4.

In FIG. 12, the six baffle plates 9A are provided. Here, as the number of the baffle plates 9A, a number in the range of 3 to 8 is desirable, and it is preferable to reduce the number of the baffle plates 9A when the working fluid has high viscosity or increase the number of the baffle plates 9A when the working fluid has low viscosity.

Figure 14:
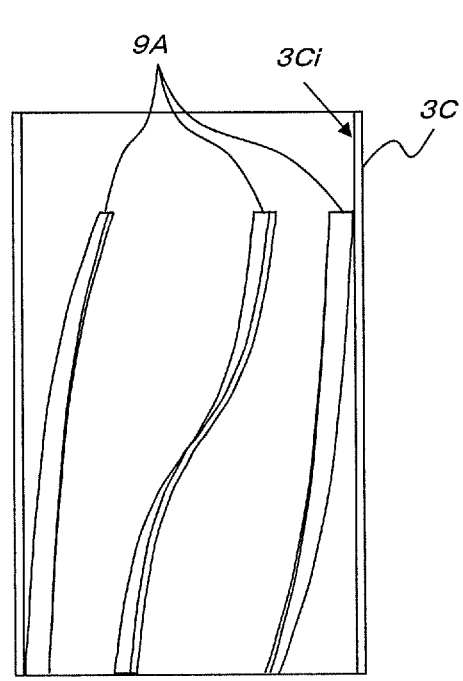
FIG. 14 is a side view showing a baffle plate according to a fifth embodiment.
Figure 15:
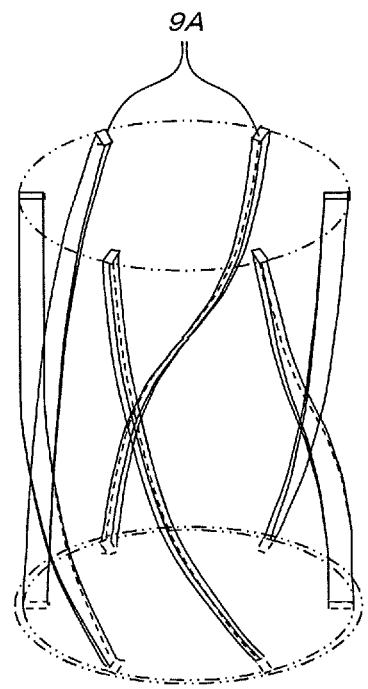
FIG. 15 is a perspective view showing the baffle plate according to the fifth embodiment.

Although not clearly shown in FIG. 10 and FIG. 12, the six baffle plates 9A are helically twisted (so as to configure part of the helix) and secured to an inner peripheral surface 3Ci of the filter casing in this state as shown in FIG. 14 and FIG. 15. For example, a lower end of one baffle plate 9A may be twisted to a position that is displaced (rotationally transferred) 60 degrees relative to an upper end of the same in the circumferential direction on the casing inner peripheral surface 3C. In such an example, the lower end of one baffle plate 9A has a projection position on a horizontal surface that coincides with a counterpart of the upper end of the baffle plate 9A adjacent to this baffle plate 9A.

According to the fifth embodiment shown in FIG. 10 to FIG. 15, each baffle plate 9A is helically arranged on the inner peripheral surface 3Ci in the filter casing. Furthermore, the helix (or part of the helix) constituted by the baffle plate 9A is formed in such a manner that the swirl flow of the working fluid in the radially outer region G of the filter 5 moves toward the lower side along the helix.

Therefore, when the shape of the helical baffle plate 9A is appropriately set, the working fluid containing foreign matters detached from the radially outer side surface of the filter element 51 can be flowed down in the annular region G (see FIG. 10) on the radially outer side of the filter element 51.

In FIG. 10, like the coolant pump 103 in FIG. 7, a low-pressure discharge opening (a refuse discharge opening) 31a is formed in a region between the baffle plates 9A, which are adjacent to each other, near a bottom portion of the filter casing 3C. When the working fluid flows down along each baffle plate 9A at the time of turning in the annular region G, foreign matters contained in the working fluid are readily discharged to the outside of the coolant pump from the low-pressure discharge opening 31a formed near the bottom portion of the filter casing 3C.

In the fifth embodiment shown in FIG. 10 to FIG. 15, although each baffle plate 9A is provided like FIG. 7, the impeller 460 (see FIG. 6 and FIG. 9) is not provided. Therefore, a turning speed of the swirl flow of the working fluid in the radially outer region G of the filter 5 (may possibly become higher than that in the embodiment shown in FIG. 7 but) does not extremely rise, and sufficient centrifugal force does not act on the foreign matters detached from the radially outer surface of the filter 5. Therefore, when the discharge opening for the foreign matters is provided at a relatively high position, the foreign matters are not efficiently discharged. Thus, the low-pressure discharge opening 31a is formed at a relatively low position.

Like the coolant pump shown in FIG. 9, when the low-pressure discharge opening 237 is formed in the region above the filter casing 3B, the helix (or part of the helix) constituted by each baffle plate 9A can be formed so that the working fluid can flow up along the helix in the annular region G and the working fluid can thereby flow up along the baffle plate 9A in the annular region G, and foreign matters contained in the working fluid can be discharged to the outside of the coolant pump from the low-pressure discharge opening 237 formed in the region above the filter casing 3B.

Other structures, functions, and effects in the fifth embodiment shown in FIG. 5 to FIG. 15 are the same as those in FIG. 1 to FIG. 9.

A sixth embodiment according to the present invention will now be described with reference to FIG. 16.

Figure 16:
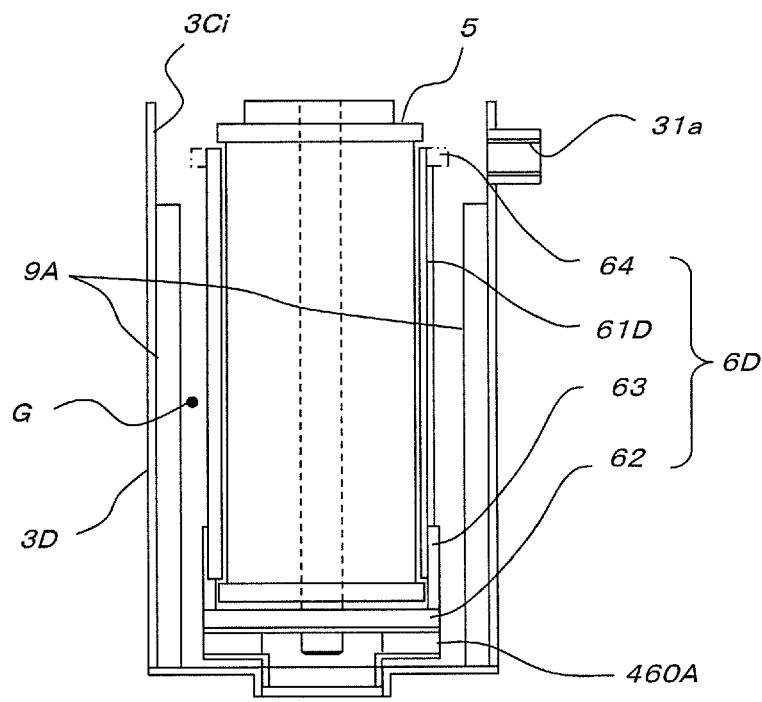
FIG. 16 is a cross-sectional view showing a primary part of a sixth embodiment.

In the sixth embodiment shown in FIG. 16, in the coolant pump to which the fifth embodiment shown in FIG. 10 to FIG. 15 is applied, an impeller 460A is provided to a lower portion of a filter casing (3C in FIG. 10 to FIG. 15, 3D in FIG. 16).

In other words, the sixth embodiment shown in FIG. 16 is an embodiment which is a combination of the fifth embodiment and the second embodiment.

Here, the impeller 460A may be of either a so-called "semi-open type" or a so-called "closed type". Further, an axial flow pump or any other rotary pump can be adopted in place of the impeller 460A.

In FIG. 16, when the impeller 460A is provided below a filter casing 3D, the working fluid can be pressurized by rotating the impeller 460A so that the working fluid can flow into an annular region G between the filter casing 3D and a filter 5.

As a result, in the coolant pump to which the filter mechanism according to the fifth embodiment is applied, the working fluid can be taken into the coolant pump by an applied pressure from the impeller 460A in addition to an inlet pressure of a trochoid pump 22 (see FIG. 1, FIG. 6, FIG. 7, and FIG. 9).

Additionally, foreign matters detached from the filter 5 present in the annular region G can be efficiently discharged from a low-pressure ejection opening 31a of the filter casing 3D by the pressure applied by the impeller 460A.

Structures, functions, and effects other than those described in the sixth embodiment in FIG. 16 are the same as the fifth embodiment shown in FIG. 10 to FIG. 15.

A seventh embodiment according to the present invention will now be described with reference to FIG. 17.

Figure 17:
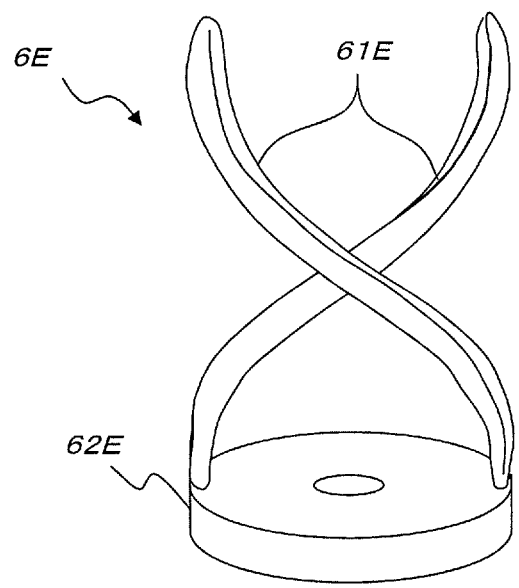
FIG. 17 is a perspective view of a rotary blade used in a seventh embodiment.

In the seventh embodiment shown in FIG. 17, each blade 61E of a rotary blade 6E is helically twisted (so as to constitute part of a helix in particular). The helix has a shape that is twisted around a central axis of a pump, and it has a function of enabling foreign matters such as fibers to move upward along the blade 61E as the rotary blade 6E rotates.

In other words, a rotating direction of the rotary blade 6E is set in such a manner that the foreign matters, e.g., fibers can move upward along the blade 61E when the rotary blade 6E rotates.

In FIG. 17, each blade 61E is directly secured to an upper surface of a discoid support member 62E.

According to the seventh embodiment in FIG. 17, since the blade 61E is helically configured, when foreign matters detached from a radially outer surface of a filter (not shown) are relatively long like fibers or the like, the foreign matters like fibers move along an edge portion of the helical blade 61E and vertically drift upward even though they get entangled with the edge portion of the blade 61E. Further, they move toward a foreign matter discharge opening (the low-pressure ejection opening 237 shown in FIG. 9) provided in an upper portion of a casing (not shown in FIG. 17).

Here, in a case that a construction that fibers as the foreign matters move downward along the blade 61E when the rotary blade 6E rotates and a low-pressure ejection opening 31a in the lower portion of the casing is formed as a foreign matter discharge opening, the fibers are gathered in a lower region of the pump and get entangled with the rotary blade 6E, and hence they are not discharged to the outside of the pump. Therefore, in the embodiment shown in FIG. 17, the helix (part of the helix) of each blade 61E of the rotary blade 6E is configured to be twisted so that foreign matters like fibers move up along the blade 61E when the rotary blade 6E rotates, and the foreign matter discharge opening is constituted of the low-pressure ejection opening 237 (see FIG. 9) provided in the upper portion.

In FIG. 17, when the rotary blade 6E rotates in the reverse direction (reverse rotation), foreign matters like fibers may possibly move down along the blade 61E and get entangled with the rotary blade 6E. Therefore, in the seventh embodiment shown in FIG. 17, it is desirable to prevent the rotary blade 6E from rotating in the reverse direction.

Structures, functions, and effects other than those described in the seventh embodiment shown in FIG. 17 are the same as the embodiment shown in FIG. 1 to FIG. 16.

Figure 18:
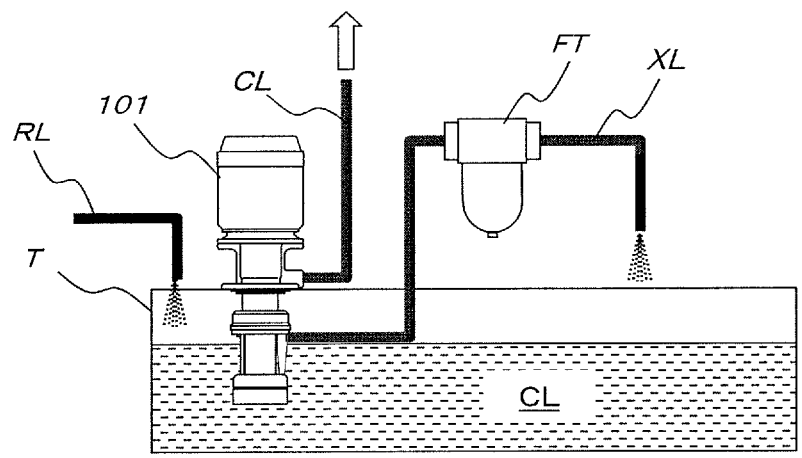
FIG. 18 is a view showing arrangement of a device when the pump depicted in FIG. 1 is used for supplying a coolant of a working machine.

Referring to FIG. 18, for example, there is illustrated a device (an equipment) that filters a coolant utilized in a working machine with use of a coolant pump 101 shown in FIG. 1, again supplies the cleaned coolant to the working machine, and separates foreign matters (which will be referred to as so-called "contaminant") collected by the coolant pump 101.

In FIG. 18, a coolant pump 101 is disposed to a coolant tank T, and a used coolant is returned to the coolant tank T from a working machine (not shown in FIG. 18) through a return line RL. Further, a coolant supply line CL is connected to the ejection opening 215 of the coolant pump 101 and communicates with the working machine (not shown in FIG. 18).

A processing line XL is connected to the low-pressure ejection opening 237 (see FIG. 1) of the coolant pump 101, and a filter FT is disposed on the path of the processing line XL. In the filter FT, various kinds of foreign matters (contaminants) mixed in the coolant are removed. After the foreign matters are removed by the filter FT, the coolant filtered by the filter FT is returned to the coolant tank T.

When the coolant is supplied from the coolant tank T to the working machine (not shown in FIG. 18) with use of the coolant pump 101, the coolant supplied to the working machine through the coolant supply line CL is filtered by a filter element 51 (see FIG. 11) in the coolant pump 101.

On the other hand, the coolant that has been taken into the coolant pump 101 but not into the working machine is filtered by the filter FT on the way to the coolant tank T through the low-pressure ejection opening 237 (see FIG. 1) of the coolant pump 101 and the processing line XL. As a result, the foreign matters mixed in the coolant that is to be returned to the coolant tank T are removed.

In FIG. 18, in place of the coolant pump 101, the coolant pump according to each embodiment shown in FIG. 6 to FIG. 17 can be used.

A description will now be given as to a case where a pump apparatus (the coolant pump) 101 having the filter mechanism according to the illustrated embodiment is applied as a coolant pump for a working machine with reference to FIG. 19.

As described above with reference to FIG. 1 to FIG. 3, the coolant pump 101 ejects the high-pressure coolant from the ejection opening 215 and ejects the low-pressure coolant from the ejection opening 237.

Figure 19:
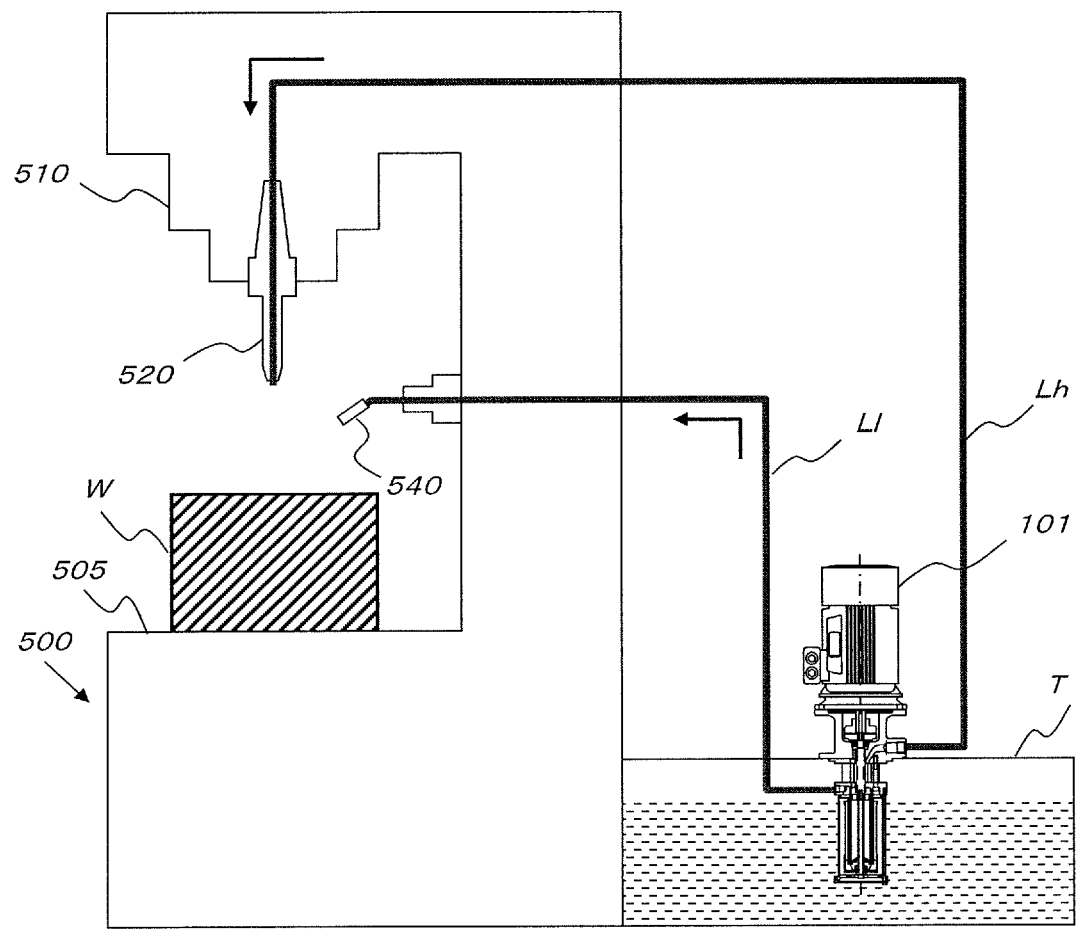
FIG. 19 is a block diagram of a machining center using the pump depicted in FIG. 1.

In FIG. 19, a machining center 500 is equipped with a machining table 505, a spindle 510, a tool 520, and a coolant nozzle 540. A workpiece W as a machining target is fixed on the machining table 505.

A high-pressure line Lh of the coolant pump 101 is connected to the ejection opening 215 (see FIG. 1) and communicates with the tool 520. Furthermore, a low-pressure line L1 of the coolant pump 101 is connected to the ejection opening 237 (see FIG. 1) and communicates with the coolant nozzle 540.

In FIG. 19, the coolant pump 101 is disposed to a coolant storage tank T.

In the machining center 500 shown in FIG. 19, the low-pressure coolant ejected from the coolant pump 101 is supplied to the nozzle 540, and it is injected to the entire workpiece W from the nozzle 540. The coolant injected to the entire workpiece W from the nozzle 540 removes chips during machining.

On the other hand, the high-pressure clean coolant ejected from the coolant pump 101 is injected from the end of the tool 520. When the coolant is injected from the end of the tool 520 with a high pressure, a cut piece can be prevented from, e.g., meshing with the workpiece W, thereby improving a machining accuracy.

As obvious from FIG. 19, when the coolant pump 101 described with reference to FIG. 1 to FIG. 5 is applied to the machining center 500, a low-pressure pump that supplies the low-pressure coolant to the nozzle 540 and a high-pressure pump that supplies the high-pressure coolant from the end of the tool 520 (the two pumps in total) do not have to be additionally provided.

That is, when the coolant pump to which the illustrated embodiment is applied (e.g., the coolant pump 101 shown in FIG. 1) is used, one coolant pump 101 alone can supply the low-pressure coolant and the high-pressure coolant to the working machine (e.g., the machining center 500).

It is to be noted that, even when a coolant pump other than the coolant pump 101 shown in FIG. 1 to FIG. 5 (the coolant pump shown in FIG. 6 to FIG. 17) is applied to, e.g., a machining center or a numerically controlled lathe, the same functions and effects as those described with reference to FIG. 19 are exercised.

The illustrated embodiment is just illustration, and it is additionally stated that the embodiment does not correspond to a description intended to restrict a technical scope of the invention.

For example, in the illustrated embodiment, the coolant is shown by example as the working fluid of the pump, but the filter mechanism according to the present invention can be likewise applied to a case where a fluid other than the coolant is used as the working fluid.

Moreover, the filter mechanism of the pump is described in the illustrated embodiment, the filter mechanism according to the present invention can be applied to a case where even a fluid machine other than the pump requires filtration of the working fluid.

REFERENCE SIGNS LIST

1 . . . electric motor
2 . . . pump unit
3 . . . filter casing
4 . . . casing closing plate
5 . . . filter
6 . . . rotary blade
7 . . . strainer plate
21 . . . upper housing
22 . . . high-pressure generation unit/trochoid pump
23 . . . lower housing
41 . . . coolant intake opening
42 . . . circular step portion
43 . . . lower surface side space portion
51 . . . filter element
52 . . . upper support member
53 . . . lower support member
61 . . . blade
62 . . . horizontal member
63 . . . vertical support member
101 to 104 . . . coolant pump
F . . . swirl flow
S1 . . . rotary shaft
S2 . . . pump shaft
S3 . . . Cylindrical rotary shaft
V . . . vortex

The invention claimed is:

1. A filter mechanism, comprising:
a substantially cylindrical filter, having an upper support member, being fixed to a first casing so as to not move relative to the first casing and being accommodated within the first casing, the substantially cylindrical filter extending along a longitudinal direction, the upper support member having at least a through hole;
a space is formed between the filter and an inner wall surface of the first casing along a radial direction; and
a movable blade is arranged in the space formed along the radial direction and is apart from an outer surface of the filter,
wherein said movable blade is movable in a circumferential direction of the filter, and the blade is constructed so that a pressure of a working fluid is lowered in the region where the movable blade passes and a differential pressure is generated between a radially outer region relative to the filter and a radially inner region of the filter, a turbulent flow and vortex are generated behind the movable blade when the blade moves, and that foreign matters adhering on a radially outer surface of the filter are detached by the force generated by the differential pressure and the force generated by the turbulent flow and vortex,
wherein the movable blade is substantially straight and extends to be parallel to a central axis of the first casing,
wherein the moveable blade integrally extends along the longitudinal direction of substantially the entire length of the filter, and
wherein a fluid inlet is connected to the space between the filter and the inner wall surface of the first casing and a fluid outlet is connected to an interior of the filter such that the working fluid passes from the radially outer region to the radially inner region of the filter and the radially inner region of the filter connects to an intake opening for the pump via the at least through hole of the upper support member,
wherein an inner wall of the first casing includes a baffle plate fixed thereto and fixed relative to the turbulent flow of the working fluid, the baffle plate extending from the inner wall surface of the first casing towards the space between the filter and the inner wall surface of the first casing along the radial direction, the movable blade being free from interference by the baffle plate so as to prevent a speed difference between a turning speed of the working fluid and a moving speed of the movable blade from being reduced.

2. The filter mechanism according to claim 1, wherein the filter mechanism is provided in a pump.

3. The filter mechanism according to claim 1, wherein a second casing accommodating a rotary pump is provided, and the second casing communicates with the first casing.

4. The filter mechanism according to claim 1, wherein the baffle plate is helically arranged.

* * * * *